United States Patent
Lanman et al.

(10) Patent No.: US 9,582,922 B2
(45) Date of Patent: Feb. 28, 2017

(54) SYSTEM, METHOD, AND COMPUTER PROGRAM PRODUCT TO PRODUCE IMAGES FOR A NEAR-EYE LIGHT FIELD DISPLAY

(71) Applicant: NVIDIA Corporation, Santa Clara, CA (US)

(72) Inventors: Douglas Robert Lanman, Sunnyvale, CA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 113 days.

(21) Appl. No.: 14/160,497

(22) Filed: Jan. 21, 2014

(65) Prior Publication Data

US 2014/0340389 A1    Nov. 20, 2014

Related U.S. Application Data

(60) Provisional application No. 61/824,914, filed on May 17, 2013.

(51) Int. Cl.
*G06T 15/04* (2011.01)
*G02B 27/01* (2006.01)
*H04N 13/04* (2006.01)

(52) U.S. Cl.
CPC ......... *G06T 15/04* (2013.01); *G02B 27/017* (2013.01); *H04N 13/044* (2013.01)

(58) Field of Classification Search
CPC .......... G06F 3/14–3/153; G06T 15/04; G09G 2300/023
See application file for complete search history.

(56) References Cited

U.S. PATENT DOCUMENTS

| | | |
|---|---|---|
| 5,499,138 A | 3/1996 | Iba |
| 5,751,383 A | 5/1998 | Yamanaka |

(Continued)

FOREIGN PATENT DOCUMENTS

| | | |
|---|---|---|
| CN | 102402011 A | 4/2012 |
| CN | 102411210 A | 4/2012 |

(Continued)

OTHER PUBLICATIONS

Pamplona, Vitor F., et al. "Tailored displays to compensate for visual aberrations." ACM Trans. Graph. 31.4 (2012): 81.*

(Continued)

*Primary Examiner* — Jacinta M Crawford
*Assistant Examiner* — Diane Wills
(74) *Attorney, Agent, or Firm* — Zilka-Kotab, PC

(57) ABSTRACT

A system, method, and computer program product are provided for producing images for a near-eye light field display. A ray defined by a pixel of a microdisplay and an optical apparatus of a near-eye light field display device is identified and the ray is intersected with a two-dimensional virtual display plane to generate map coordinates corresponding to the pixel. A color for the pixel is computed based on the map coordinates. The optical apparatus of the near-eye light field display device may, for example, be a microlens of a microlens array positioned between a viewer and an emissive microdisplay or a pinlight of a pinlight array positioned behind a transmissive microdisplay relative to the viewer.

20 Claims, 13 Drawing Sheets

(56) References Cited

U.S. PATENT DOCUMENTS

| | | | |
|---|---|---|---|
| 5,883,606 A | 3/1999 | Smoot | |
| 6,097,394 A * | 8/2000 | Levoy | G02B 27/2271 |
| | | | 345/419 |
| 6,160,667 A | 12/2000 | Smoot | |
| 6,215,593 B1 | 4/2001 | Bruce | |
| 7,667,783 B2 | 2/2010 | Hong et al. | |
| 8,724,039 B2 | 5/2014 | Huang et al. | |
| 9,217,872 B2 | 12/2015 | Niioka et al. | |
| 9,275,303 B2 | 3/2016 | Cvetkovic et al. | |
| 9,406,166 B2 | 8/2016 | Futterer | |
| 9,519,144 B2 | 12/2016 | Lanman et al. | |
| 2004/0150583 A1 | 8/2004 | Fukushima et al. | |
| 2005/0099689 A1 | 5/2005 | Fukushima et al. | |
| 2005/0264881 A1 | 12/2005 | Takagi et al. | |
| 2005/0280894 A1 | 12/2005 | Hartkop et al. | |
| 2006/0125916 A1 | 6/2006 | Mashitani et al. | |
| 2006/0227067 A1 | 10/2006 | Iwasaki | |
| 2007/0126657 A1 | 6/2007 | Kimpe | |
| 2010/0271467 A1 | 10/2010 | Akeley | |
| 2012/0026583 A1 | 2/2012 | Kuwayama et al. | |
| 2012/0057228 A1 | 3/2012 | Okamoto | |
| 2012/0212399 A1 | 8/2012 | Border et al. | |
| 2013/0082905 A1* | 4/2013 | Ranieri | H04N 13/0409 |
| | | | 345/32 |
| 2013/0107024 A1* | 5/2013 | Akeley | H04N 13/0406 |
| | | | 348/59 |
| 2013/0120605 A1* | 5/2013 | Georgiev | G06T 15/205 |
| | | | 348/222.1 |
| 2014/0049666 A1* | 2/2014 | Tsutsumi | H04N 5/23212 |
| | | | 348/239 |
| 2014/0168034 A1 | 6/2014 | Luebke et al. | |
| 2014/0168035 A1 | 6/2014 | Luebke et al. | |
| 2014/0168783 A1 | 6/2014 | Luebke et al. | |
| 2014/0340390 A1 | 11/2014 | Lanman et al. | |
| 2015/0130995 A1 | 5/2015 | Nishiyama et al. | |
| 2015/0177514 A1 | 6/2015 | Maimone et al. | |
| 2015/0319430 A1 | 11/2015 | Lapstun | |
| 2016/0026253 A1 | 1/2016 | Bradski et al. | |
| 2016/0033771 A1 | 2/2016 | Tremblay et al. | |

FOREIGN PATENT DOCUMENTS

| | | |
|---|---|---|
| JP | 2011145607 A | 7/2011 |
| JP | 2012053342 A | 3/2012 |
| WO | 2014186625 A1 | 11/2014 |

OTHER PUBLICATIONS

U.S. Appl. No. 14/323,965, filed Jul. 3, 2014.
International Search Report and Written Opinion from International Application No. PCT/US2014/038270, dated Oct. 10, 2014.
U.S. Appl. No. 13/720,809, filed Dec. 19, 2012.
U.S. Appl. No. 13/720,831, filed Dec. 19, 2012.
U.S. Appl. No. 13/720,842, filed Dec. 19, 2012.
U.S. Appl. No. 14/134,637, filed Dec. 19, 2013.
Son, J.-Y. et al., "3D displays using light from an undiffused point-source array," SPIE Newsroom, 10.1117/2.1200902.1414, Feb. 13, 2009, pp. 1-2.
Son, J.-Y. et al., "Three-dimensional imaging system based on a light-emitting diode array," Optical Engineering, vol. 46, No. 10, Oct. 2007, pp. 103205/1-103205/4.
Lanman, D., et al., "Near-Eye Light-Field Displays," ACM Transactions on Graphics (TOG), Proceedings of SIGGRAPH Asia, vol. 32, Issue 6, Nov. 2013, pp. 1-10.
"Dimension Technologies Inc.—Virtual Window 19," retrieved from www.dti3d.com/component/page,shop.product_details/flypage,flypage_images.tpl/product_id,27/category_id,1/option,com_virtuemart/Itemid,94/ on Dec. 15, 2013.
Wetzstein, G. et al., "Tensor Displays: Compressive Light Field Synthesis Using Multilayer Displays with Directional Backlighting," ACM Transactions on Graphics SIGGRAPH 2012 Conference Proceedings, vol. 31, Issue 4, Jul. 2012, pp. 1-11.
Maimone, A. et al., "Computational Augmented Reality Eyeglasses," Proceeding from International Symposium on Mixed and Augmented Reality, Oct. 1-4, 2013, pp. 1-10.
Non-Final Office Action from U.S. Appl. No. 14/134,637, dated Mar. 11, 2016.
Non-Final Office Action from U.S. Appl. No. 14/323,965, dated Mar. 16, 2016.
Son, J.-Y. et al., "30 displays using light from an undiffused point-source array," SPIE Newsroom, 10.1117/2.1200902.1414, Feb. 2009, pp. 1-2.
Final Office Action from U.S. Appl. No. 14/134,637, dated Aug. 19, 2016.
Notice of Allowance from U.S. Appl. No. 14/134,637, dated Oct. 28, 2016.
Office Action from Chinese Patent Application No. 201480028202.5, dated Jan. 10, 2017.

* cited by examiner

Existing Image 300

Microdisplay Image 310

Virtual Image 320

Elemental Image without Anti-aliasing 330

Elemental Image with Anti-aliasing 340

SYSTEM, METHOD, AND COMPUTER PROGRAM PRODUCT TO PRODUCE IMAGES FOR A NEAR-EYE LIGHT FIELD DISPLAY

CLAIM OF PRIORITY

This application claims the benefit of U.S. Provisional Application No. 61/824,914, filed May 17, 2013, the entire contents of which is incorporated herein by reference.

FIELD OF THE INVENTION

The present invention relates to a producing images, and more specifically to producing images for a near-eye light field display.

BACKGROUND

Near-eye displays (NEDs) include head-mounted displays (HMDs) that may project images directly into a viewer's eyes. Such displays may overcome the limited screen size afforded by other mobile display form factors by synthesizing virtual large-format display surfaces, or may be used for virtual or augmented reality applications. One type of NED is a near-eye light field display that may be implemented as a thin lightweight head-mounted display that includes a pair of microlenses configured between a viewer's eye and a corresponding pair of microdisplays. Such a near-eye light field display is capable of synthesizing light fields corresponding to virtual objects within a viewer's natural accommodation range.

The images that are viewed using the near-eye light field display comprise an array of elemental images where each elemental image corresponds to one of the microlenses in the microlens array. The images displayed by the microdisplays are therefore, quite different compared with images displayed by conventional display devices. Consequently, content (e.g., images, movies, and video games) developed for conventional two-dimensional display devices and stereoscopic display devices (e.g., 3DTV) cannot be directly displayed using the near-eye light-field display. Thus, there is a need for addressing this issue and/or other issues associated with the prior art.

SUMMARY

A system, method, and computer program product are provided for producing images for a near-eye light field display. A ray defined by a pixel of a microdisplay and an optical apparatus of a near-eye light field display device is identified and the ray is intersected with a two-dimensional virtual display plane to generate map coordinates corresponding to the pixel. A color for the pixel is computed based on the map coordinates. The optical apparatus of the near-eye light field display device may, for example, be a microlens of a microlens array positioned between a viewer and an emissive microdisplay or a pinlight of a pinlight array positioned behind a transmissive microdisplay relative to the viewer.

DETAILED DESCRIPTION

Figure 1:
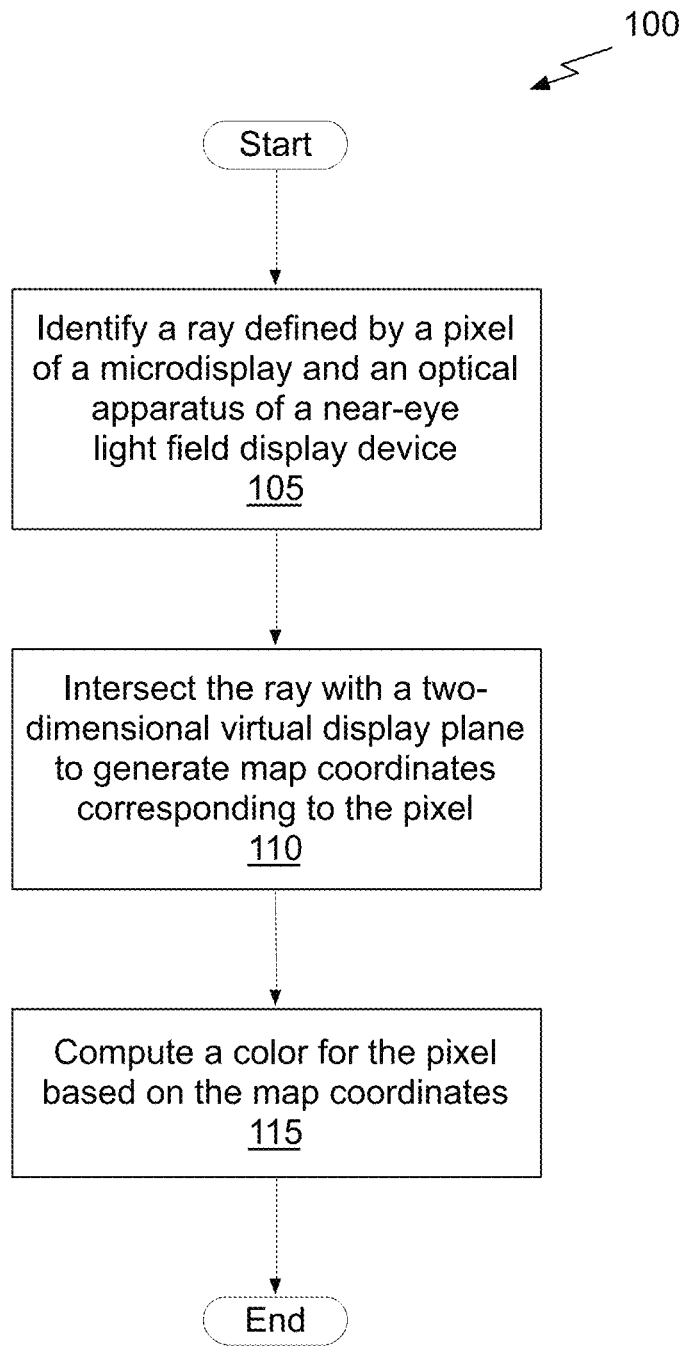
FIG. 1 illustrates a flowchart of a method for producing images for a near-eye light field display, in accordance with one embodiment.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications, and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "displaying," "generating," "producing," "calculating," "determining," "radiating," "emitting," "attenuating," "modulating," "transmitting," "receiving," or the like, refer to actions and processes (e.g., flowcharts 100 of FIG. 1) of a computer system or similar electronic computing device or processor (e.g., computing system 710 of FIG. 7). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

A near-eye light field display allows a user wearing an eyeglass-type apparatus to view a synthetic image that appears to be positioned within the user's accommodation range.

As described herein, near-eye light field displays enable thin, lightweight head-mounted displays (HMDs) capable of presenting nearly correct convergence, accommodation, binocular disparity, and retinal defocus depth cues. The near-eye light field display device is positioned close to a user's eyes, closer than a near focus plane defining the user's accommodation range. Typically, objects positioned closer than a near focus plane appear blurry. However, images displayed using the near-eye light field display device may appear in focus to a viewer. Sharp images may be depicted by the near-eye light field display device when light fields corresponding to virtual objects within the user's natural accommodation range are synthesized. Simply displaying existing two-dimensional monoscopic, stereoscopic, and multiscopic content suitable intended for display by conventional display devices will not produce sharp images when displayed by the near-eye light field display device.

Therefore, existing two-dimensional monoscopic, stereoscopic, and multiscopic content suitable for display by conventional display devices should be processed to produce an image or images for display by the near-eye light field display device. An existing image that is desired to be displayed may be processed to generate a processed image that comprises an array of elemental images. Each elemental image is a view of the desired existing image corresponding to one microlens within a microlens array through which a user views the processed image. When the processed image is viewed through the microlens array, the user sees the desired existing image mapped to a virtual display plane that is within the user's natural accommodation range. When a pinlight-based near-eye light field display device is used, each elemental image is a view of the desired existing image corresponding to one pinlight within a pinlight array. The user views the pinlight array through a transmissive display layer that encodes the processed image (i.e., light rays generated by the pinlight array are projected through the display layer). When the processed image is viewed through the transmissive display layer that is positioned in front of the pinlight array, the user sees the desired existing image mapped to a virtual display plane that is within the user's natural accommodation range.

FIG. 1 illustrates a flowchart of a method 100 for producing images for a near-eye light field display device, in accordance with one embodiment. In one embodiment, the steps shown in FIG. 1 may be performed by a processor configured to execute a graphics shader program. At step 105, a ray defined by a pixel of a microdisplay and an optical apparatus of the near-eye light field display device is identified. In the context of the following description, a microdisplay is a backlit transmissive display such as a LCD (liquid crystal display) panel, or an emissive display such as an OLED (organic light-emitting diode) panel or chip. The near-eye light field display device includes the microdisplay.

In one embodiment, the microdisplay is an emissive display that is configured to be viewed through a two-dimensional array of microlenses, where each microlens is an optical apparatus that, in combination with a pixel of the microdisplay may define the ray of step 105. In the context of the following description, an array of microlenses is a two-dimensional array including at least two microlenses. In one embodiment, the near-eye light field display device is embodied in an eyeglass form factor that includes two microdisplays and two microlens arrays to form a binocular near-eye light field display device, where a first microdisplay and microlens array set is associated with a user's left eye and a second microdisplay and microlens array set is associated with a user's right eye.

In another embodiment, the microdisplay is a transmissive (i.e., of variable opacity and color, capable of becoming substantially transparent) display that is positioned between a viewer and a two-dimensional array of pinlights, where each pinlight is an optical apparatus. The pinlight array is viewed through the microdisplay. The ray of step 105 is defined by a pixel of the microdisplay and a pinlight in the pinlight array.

In one embodiment, the near-eye light field display is implemented as a tensor display, for example as described by Wetzstein et al, "Tensor Displays: Compressive Light Field Synthesis Using Multilayer Displays with Directional Backlighting," ACM Transactions on Graphics SIGGRAPH 2012 Conference Proceedings, Volume 31 Issue 4, Jul. 2012. A display assembly may comprise a microdisplay and an optical apparatus, where the optical apparatus may comprise one or more microlenses, one or more pinlights, one or more pinholes, or one or more transmissive layers included in a tensor display assembly.

At step 110, the ray is intersected with a two-dimensional virtual display plane to generate map coordinates corresponding to the pixel. In the context of the present description, the virtual display plane is a virtual plane that appears to the viewer to be positioned at or beyond the near focus plane. In one embodiment, the virtual display plane is in front of a far plane beyond which objects may appear out of focus to the viewer.

At step 115, a color for the pixel is computed based on the map coordinates. In one embodiment, the map coordinates correspond to a texture map that stores an existing image. In one embodiment, the existing image that is stored as a texture map may be preprocessed to produce pixel colors for an anti-aliased image. In the context of the following description, colors may be computed for each pixel of the microdisplay to process an existing image for display by the near-eye light field display device. When the existing image is one image of an existing stereo image pair, the existing image for the other eye (left or right eye) may be processed to produce a corresponding left or right eye image for display by the near-eye light field display device. The stereo image pair that is produced may be simultaneously viewed by the user of the near-eye light field display device to produce a virtual image at the virtual display plane that appears to be three-dimensional. Thus, the three-dimensional qualities of the existing stereoscopic pair are also present in the virtual image.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
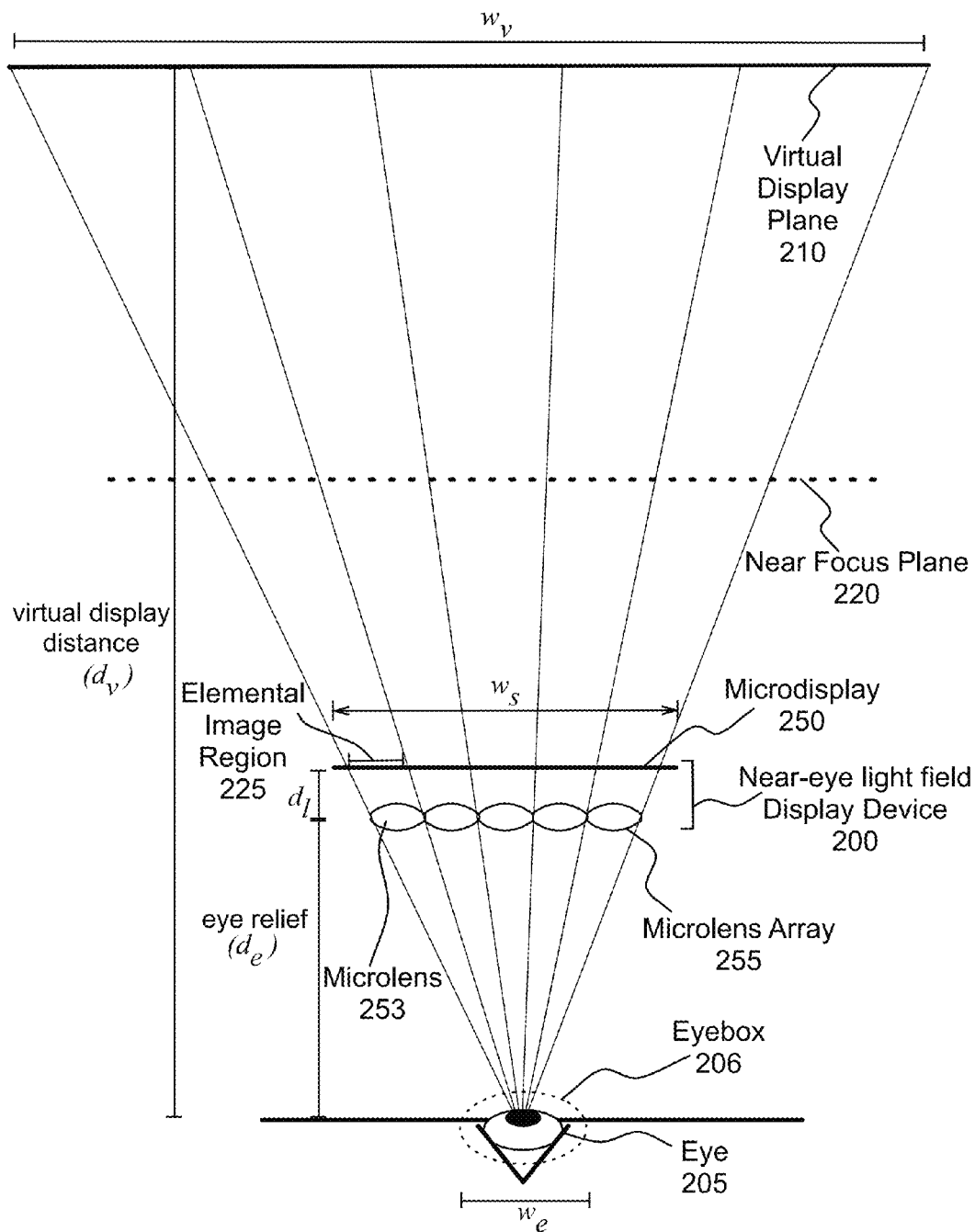
FIG. 2A illustrates an eye of a viewer and a near-eye light field display, according to one embodiment.

FIG. 2A illustrates an eye 205 of a viewer and a near-eye light field display device 200, according to one embodiment. In one embodiment, an eyebox 206 defines characteristics of the eye 205, such as expected diameters, orientations (i.e., rotations), and positions of the pupil. A width of the eyebox 206 is shown in FIG. 2A as $w_e$. Objects between the eye 205 and a near focus plane 220 are too close to the eye 205 to be clearly seen because the eye 205 cannot focus on objects that are closer to the eye 205 than the near focus plane 220. The eye 205 is able to focus on objects that are at or beyond (i.e., further away) the near focus plane 220. Objects that are very far away may also not appear clearly and a range referred to as an accommodation range within which objects may appear clearly is bounded by the near focus plane 220 and a far plane (not shown) that is a distance from the near focus plane 220 equal to the accommodation range. Because conventional eyeglasses are positioned closer to the eye 205 than the near focus plane 220, an image that is displayed on the surface of conventional eyeglasses will not be clear to the viewer. Similarly, an existing image that is displayed by a microdisplay 250 will not be clear to the viewer.

The microdisplay 250 is separated from a microlens array 255 by a distance $d_f$. The microlens array 255 is positioned at a distance $d_e$ that corresponds to an eye relief distance. A microdisplay image displayed by the microdisplay 250 appears to the viewer to be mapped to a virtual display plane 210 that is positioned at a virtual display distance $d_v$ from the eye 205. The microdisplay image may be produced from an existing image. The distance $d_v$ may be different for each eye 205, allowing for correction of the viewer's optical aberrations (i.e., an eyeglass prescription). The width of the virtual display plane 210 is $w_v$ and the width of the microdisplay 250 is $w_s$.

Typically, a three-dimensional scene will be rendered to generate a two-dimensional (2D) image for display by the microdisplay 250. A microdisplay image that is displayed by the microdisplay 250 includes an elemental image corresponding to a view for each microlens in the microlens array 255. For example, an elemental image is displayed at the elemental image region 225 corresponding to the microlens 253. The elemental image region 225 is a two dimensional region having a width of $\Delta w_s$, and is defined as the intersection at the microdisplay 250 of a projection from the pupil of the eye 205 through the microlens 253. Each elemental image region and corresponding microlens (e.g., elemental image region 225 and microlens 253) acts as an independent lens-limited magnifier, synthesizing an off-axis perspective projection of a virtual image located a distance $d_v$ from the eye 205 (i.e., at the virtual display plane 210). Portions of the virtual image are repeated across the different elemental image regions as shown in FIG. 3B.

Rendering a 3D scene to produce a microdisplay image for display by the microdisplay 250 requires rendering each elemental image that is included in the microdisplay image. In contrast, only a single image is rendered for display by a conventional display device. In some cases, the 3D scene is not available to be rendered, such as for existing content comprising conventional 2D images. However, the existing content intended for display by a conventional display device may be processed for display by the microdisplay 250. In particular, existing stereoscopic image pairs are widely available for 3D television, and the existing stereoscopic image pairs may be processed for display by the microdisplay 250.

Figure 2B:
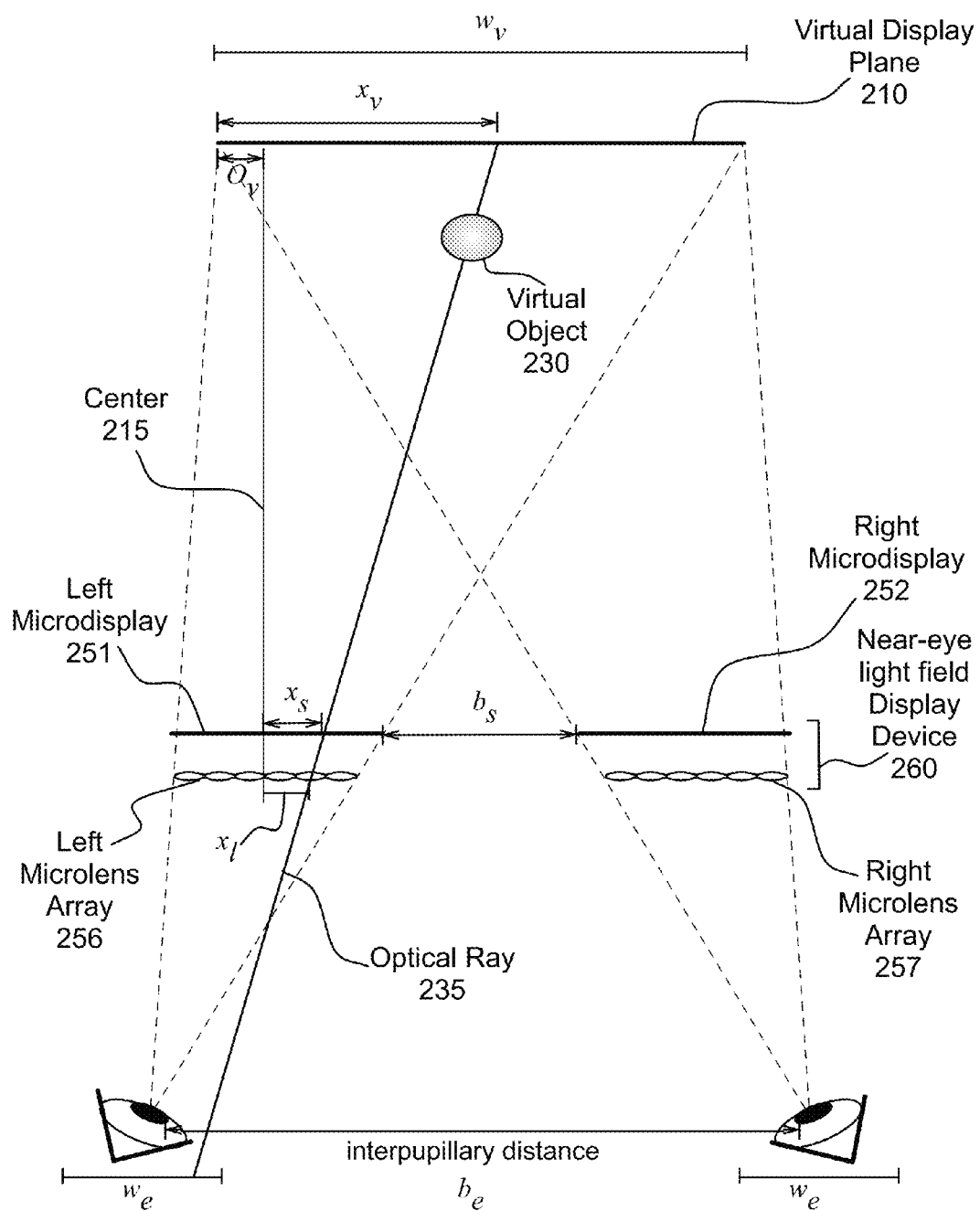
FIG. 2B illustrates a binocular near-eye light field display, according to one embodiment.

FIG. 2B illustrates a binocular near-eye light field display device 260, according to one embodiment. The binocular near-eye light field display device 260 includes a left microdisplay 251 that is paired with a left microlens array 256 and a right microdisplay 252 that is paired with a right microlens array 257. The left microdisplay 251 and the right microdisplay 252 are separated by a distance $b_s$ measured from the right edge of the left microdisplay 251 to the left edge of the right microdisplay 252. The interpupillary distance between centers of the pupils of the viewer's left and right eyes is $b_e$. The near-eye light field display device 260 emulates the appearance of a conventional stereoscopic display located a distance $d_v$ from the viewer (i.e., at the virtual display plane 210). In one embodiment, $b_e$ is a fixed, average distance such as an interocular distance rather than a dynamically sampled interpupillary distance.

A viewer looking through the near-eye light field display device 260 will perceive a rectangular virtual display surface at the virtual image plane 210 that is texture mapped with corresponding left and right eye views of an existing stereoscopic image pair. Therefore, a pair of texture maps is stored for an existing stereoscopic image pair. The left and right eye frustums are indicated by dashed lines in FIG. 2B. For a monoscopic existing image, only one existing image is stored as a texture map that is used to determine pixel color for both the left microdisplay 251 and the right microdisplay 252. The existing image is mapped as a texture onto the virtual display plane 210 to produce a virtual image. Each pixel of the virtual image at the virtual display plane 210 corresponds to a color defined by the existing image. The virtual image is then used to compute colors for each pixel of the left microdisplay 251 and the right microdisplay 252. In simple terms, a color of a pixel on a microdisplay is computed by casting a ray from the pixel on the microdisplay to intersect the virtual display plane 210 and then calculating a color of the pixel on a microdisplay using one or more samples of the virtual image at the point of intersection.

objects, such as the virtual object 230 that appear at different depths relative to the virtual display plane 210. For a pixel located a distance $x_s$ from the center 215 of the left microdisplay 251, ray tracing may be employed to compute a color. The virtual object 230 appears displaced in front of the virtual display plane 210 as intended by the existing stereoscopic image pair. The depth of the virtual object 230 is not readily available after the 3D scene has been rendered to produce the existing stereoscopic image pair, but the intended displacements are substantially retained when a microdisplay stereoscopic image pair is generated for the existing stereoscopic image pair.

The pixel is visible, to the viewer's left eye, through the left microlens array 256 having an optical center that is laterally displaced by a distance $x_l$ from the center 215 of the left microdisplay 251. Any optical ray is defined by a point of a pixel on a microdisplay and a point at the optical center of the intersected microlens. As shown in FIG. 2B, the 3D coordinates of the center of the microlens and the pixel define an optical ray 235. Note, that the distances are described in terms of the coordinate x, and corresponding distances may also be defined in terms of the y coordinate to produce distances $y_l$ and $y_s$ relative to a reference point on the left microdisplay 251.

The pseudo code shown in TABLE 2 may be included in a fragment shader program to define the dimensions shown in FIG. 2A and other system parameters as uniform variables.

TABLE 2

| | | |
|---|---|---|
| uniform sampler2D | viewTexture; | // texture map of existing image |
| // microdisplay variables | | |
| uniform vec2 | microdisplayDim; | // physical dimensions mm [$w_s$] |
| uniform int | microdisplayOrientation; | // 0: upright, 1: inverted |
| //microlens array variables | | |
| uniform float | microlensPitch; | // pitch (mm) [$w_l$] |
| uniform float | microlensDist; | // distance from microdisplay (mm) [$d_l$] |
| uniform float | microlensRotation; | // rotation angle (radians) |
| uniform vec2 | microlensOffset; | // alignment offsets (mm) |
| uniform bool | microlensExcludeBorder; | // exclude partial microlenses // along the microdisplay border |
| // elemental image variables | | |
| uniform float | elemenalImagePitch; | // pitch (mm) [$\Delta w_s$] |
| uniform vec2 | elemenalImageOffset; | // offset from microdisplay origin (mm) |
| uniform vec4 | elemenalImageRange; | // index range (min column, max column, // min row, max row) |
| // Virtual display plane variables | | |
| uniform vec2 | screenDim; | // physical dimensions (mm) [$w_v$] |
| uniform float | screenDist; | // distance from microlens array (mm) [$d_v$] |
| uniform vec2 | screenPosition; | // offset from microdisplay origin (mm) [$o_v$] |

The pseudo code shown in TABLE 1 may be included in a vertex shader program to map the existing image to the virtual display plane 210.

TABLE 1

```
Void (main( ){
    // Evaluate interpolated texture coordinates.
    gl_TexCoord[0] = gl_MultiTExCoord0;
    //Emulate vertex transformation performed by a fixed-function
    pipeline
    gl_Position = gl_ModelViewProjectionMatrix*gl_Vertex;
}
```

Rendering images for the near-eye light field display device 260 requires assigning the color of each pixel of the left microdisplay 251 and right microdisplay 252 such that the emitted light field approximates a virtual image at the virtual display plane 210. The virtual image may include The displacement $x_s$ may be evaluated for a texel having the texture map coordinates (s,t) based on the microdisplay orientation and dimensions. The pseudo code shown in TABLE 3 may be included in a fragment shader program to compute the displacement for a pixel relative to a reference point on a microdisplay, $x_s$ (microdisplayCoord).

TABLE 3

```
vec2 microdisplayCoord;
if (microdisplayOrientation == 0)
    microdisplayCoord = microdisplayDim*(gl_TexCoord[0].st − 0.5);
else
    microdisplayCoord = microdisplayDim*(0.5 − gl_TexCoord[0].st);
```

The position of the optical center of the corresponding microlens, $x_l$, may be evaluated based on the orientation of the microlens array and the displacement $x_s$. The pseudo code shown in TABLE 4 may be included in a fragment shader program to compute the optical center of the corresponding microlens, $x_l$ (microlensCoord).

TABLE 4 mat2 R = mat2(cos(microlensRotation), −sin(microlensRotation),
    sin(microlensRotation), cos(microlensRotation) );;
vec2 microlensIndex = floor(R*
    (microdisplayCoord −elementalImageOffset)/elementalImagePitch);
vec2 microlensCoord = transpose(R)*microlensPitch*microlensIndex +
microlensOffset;

Then, the horizontal coordinate or displacement of the point of intersection of the optical ray 235 and the virtual display plane 210 (i.e., virtual image), $x_v$ may be computed as:

$$x_v = x_i + \left(\frac{d_v - d_e}{d_l}\right)(x_s - x_l) - o_v.$$

A vertical coordinate may be similarly computed for the point of intersection of the optical ray 235 and the virtual display plane 210. In other embodiments, a reference location on the microdisplay 251 other than the center 215 may be used to determine the distances $x_s$, $x_l$, $o_v$, and $x_v$.

The pseudo code shown in TABLE 5 may be included in a fragment shader program to $x_v$ (screenCoord).

TABLE 5 vec2 screenCoord = microlensCoord + (screenDist/microlensDist)*
(microdisplayCoord− microlensCoord) − screenPosition;

The color of the pixel, gl_FragColor, may be computed by converting the screen coordinates $(x_v, y_v)$ to texture map coordinates (s,t). Because artifacts can result when a portion of the virtual image is visible through peripheral microlenses, pixels that are outside of the virtual display plane 210 are set to black when the microlensExcludeBorder Boolean variable is TRUE.

TABLE 6 vec2 texCoord = screenCoord/screenDim;
if( ((texCoord.x>0.0) && (texCoord.x<1.0)) && ((texCoord.y>0.0) &&
(texCoord.y<1.0)) ) {
   if ( !microlensExcludeBorder ||
     ( ((microlensIndex.x > elementalImageRange.x) &&
       (microlensIndex.x < elementalImageRange.y)) &&
       (microlensIndex.y > elementalImageRange.z) &&
       (microlensIndex.y < elementalImageRange.w)) ) )
      gl_FragColor = vec4(texture2D(viewTexture, texCoord).rgb, 1);
   else
      gl_FragColor = vec4(0.0, 0.0, 0.0, 1.0);
} else
   gl_FragColor = vec4(0.0, 0.0, 0.0, 1.0);

Ray tracing provides a direct estimate of the color of the pixel for the left microdisplay 251. Casting a set of rays defined by each pixel located within the elemental image region corresponding to a microlens provides estimates of the color of each pixel in an elemental image. Casting sets of rays for each elemental image region corresponding to a microlens provides estimates of the color of each pixel in the microdisplay image for the left microdisplay 251 and in the microdisplay image for the right microdisplay 252.

Figure 2C:
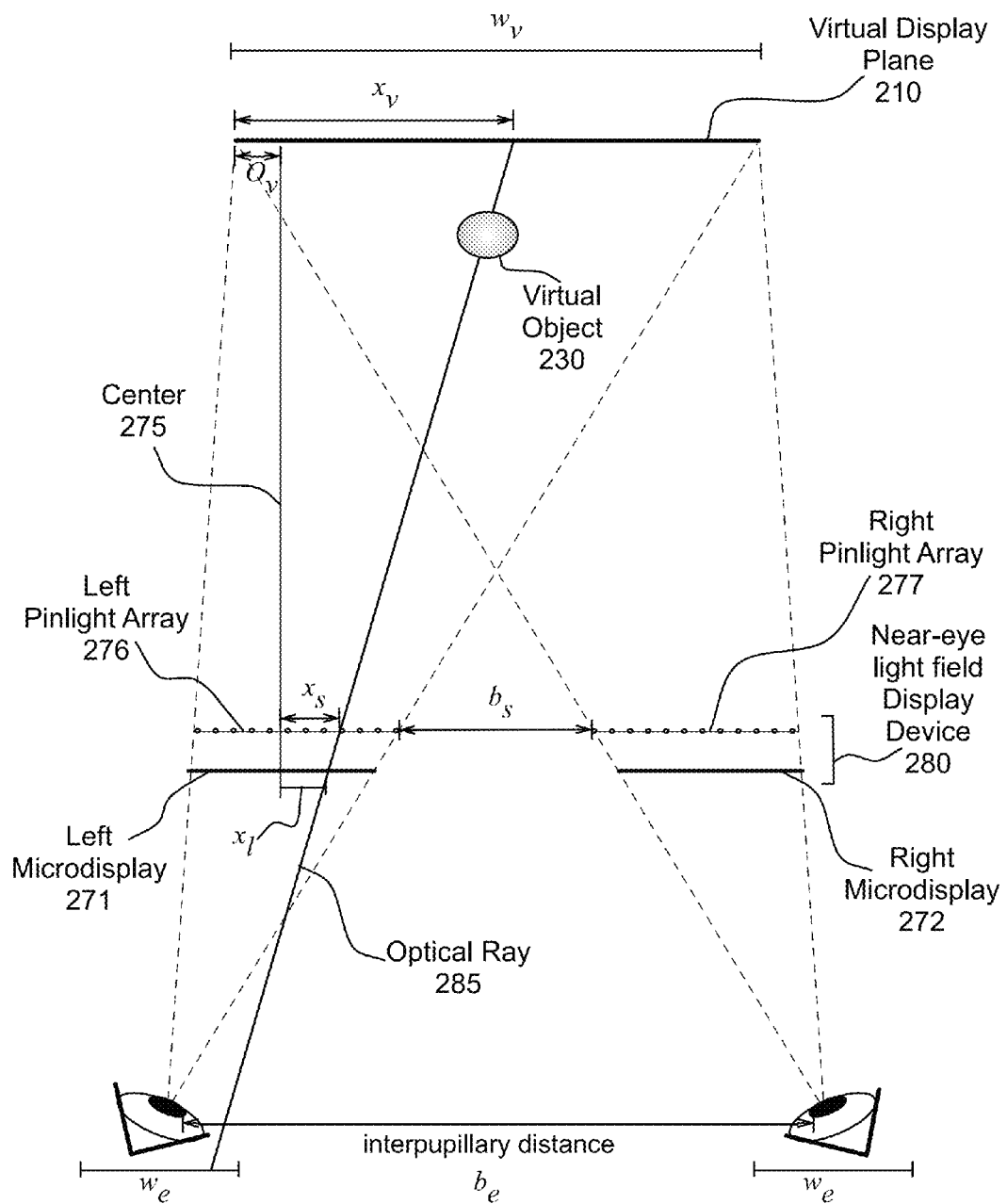
FIG. 2C illustrates another binocular near-eye light field display, according to one embodiment.

FIG. 2C illustrates a binocular near-eye light field display device 280, according to one embodiment. In contrast with the near-eye light field display device 260 shown in FIG. 2B that uses a lens (e.g., lens within the left microlens array 256 and right microlens array 257) as an optical apparatus positioned between a viewer and an emissive microdisplay (e.g., the left microdisplay 251 and the right microdisplay 252), the near-eye light field display device 280 uses a pinlight of a pinlight array positioned behind a transmissive microdisplay relative to the viewer. The binocular near-eye light field display device 260 includes a left microdisplay 271 that is paired with a left pinlight array 276 and a right microdisplay 272 that is paired with a right pinlight array 277.

The left microdisplay 271 and the right microdisplay 272 are separated by a distance $b_s$ measured from the right edge of the left microdisplay 271 to the left edge of the right microdisplay 272. The interpupillary distance between centers of the pupils of the viewer's left and right eyes is $b_e$. The near-eye light field display device 280 emulates the appearance of a conventional stereoscopic display located a distance $d_v$ from the viewer (i.e., at the virtual display plane 210). In one embodiment, $b_e$ is a fixed, average distance such as an interocular distance rather than a dynamically sampled interpupillary distance.

A viewer looking through the near-eye light field display device 280 will perceive a rectangular virtual display surface at the virtual image plane 210 that is texture mapped with corresponding left and right eye views of an existing stereoscopic image pair. Therefore, a pair of texture maps is stored for an existing stereoscopic image pair. In other embodiments, the virtual display surface may be a different shape that is not necessarily rectangular. The left and right eye frustums are indicated by dashed lines in FIG. 2C. For a monoscopic existing image, only one existing image is stored as a texture map that is used to determine pixel color for both the left microdisplay 271 and the right microdisplay 272. The existing image is mapped as a texture onto the virtual display plane 210 to produce a virtual image. Each pixel of the virtual image at the virtual display plane 210 corresponds to a color defined by the existing image. The virtual image is then used to compute colors for each pixel of the left microdisplay 271 and the right microdisplay 272. In simple terms, a color of a pixel on a microdisplay is computed by casting a ray from the pixel on the microdisplay to intersect the virtual display plane 210 and then calculating a color of the pixel on a microdisplay using one or more samples of the virtual image at the point of intersection.

As previously explained in conjunction with FIG. 2B, the pseudo code shown in TABLE 1 may be included in a vertex shader program to map the existing image to the virtual display plane 210. Rendering images for the near-eye light field display device 280 requires assigning the color of each pixel of the left microdisplay 271 and right microdisplay 272 such that the emitted light field approximates a virtual image at the virtual display plane 210. The virtual image may include objects, such as the virtual object 230 that appear at different depths relative to the virtual display plane 210. For a pixel located a distance $x_s$ from the center 275 of the left microdisplay 271, ray tracing may be employed to compute a color. The virtual object 230 appears displaced in front of the virtual display plane 210 as intended by the existing stereoscopic image pair. The depth of the virtual object 230 is not readily available after the 3D scene has been rendered to produce the existing stereoscopic image pair, but the intended displacements are substantially retained when a microdisplay stereoscopic image pair is generated for the existing stereoscopic image pair.

The pixel is visible, to the viewer's left eye, at the left microdisplay 271 having an optical center that is laterally displaced by a distance $x_l$ from the center 275 of the left microdisplay 271. Any optical ray is defined by a point of a pixel on a microdisplay and a point at the optical center of the intersected pinlight in the corresponding pinlight array. As shown in FIG. 2C, the 3D coordinates of the center of the intersected pinlight and the pixel define an optical ray 285. Note, that the distances are described in terms of the coordinate x, and corresponding distances may also be defined in terms of the y coordinate to produce distances $y_l$ and $y_s$, relative to a reference point on the left microdisplay 271.

The displacement $x_l$ may be evaluated for a texel having the texture map coordinates (s,t) based on the microdisplay orientation and dimensions. The position of the optical center of the corresponding pinlight, $x_s$, may be evaluated based on the orientation of the pinlight array and the displacement $x_l$. Then, the horizontal coordinate or displacement of the point of intersection of the optical ray 285 and the virtual display plane 210 (i.e., virtual image), xv may be computed as:

$$x_v = x_l + \left(\frac{d_v - d_e}{d_l}\right)(x_s - x_l) - o_v.$$

A vertical coordinate may be similarly computed for the point of intersection of the optical ray 285 and the virtual display plane 210. In other embodiments, a reference location on the microdisplay 271 other than the center 275 may be used to determine the distances $x_s$, $x_l$, $o_v$, and $x_v$.

A fragment shader program may be configured to compute the displacement for a pixel relative to a reference point on a microdisplay, $x_l$ (microdisplayCoord), the optical center of the corresponding pinlight, $x_s$ (pinlightCoord), and the horizontal coordinate $x_v$ (screenCoord).

The color of the pixel, gl_FragColor, may be computed by converting the screen coordinates ($x_v$, $y_v$) to texture map coordinates (s,t). Ray tracing provides a direct estimate of the color of the pixel for the left microdisplay 271. Casting a set of rays defined by each pixel located within the elemental image region corresponding to a pinlight provides estimates of the color of each pixel in an elemental image. Casting sets of rays for each elemental image region corresponding to a pinlight provides estimates of the color of each pixel in the microdisplay image for the left microdisplay 271 and in the microdisplay image for the right microdisplay 272.

Figure 3A:
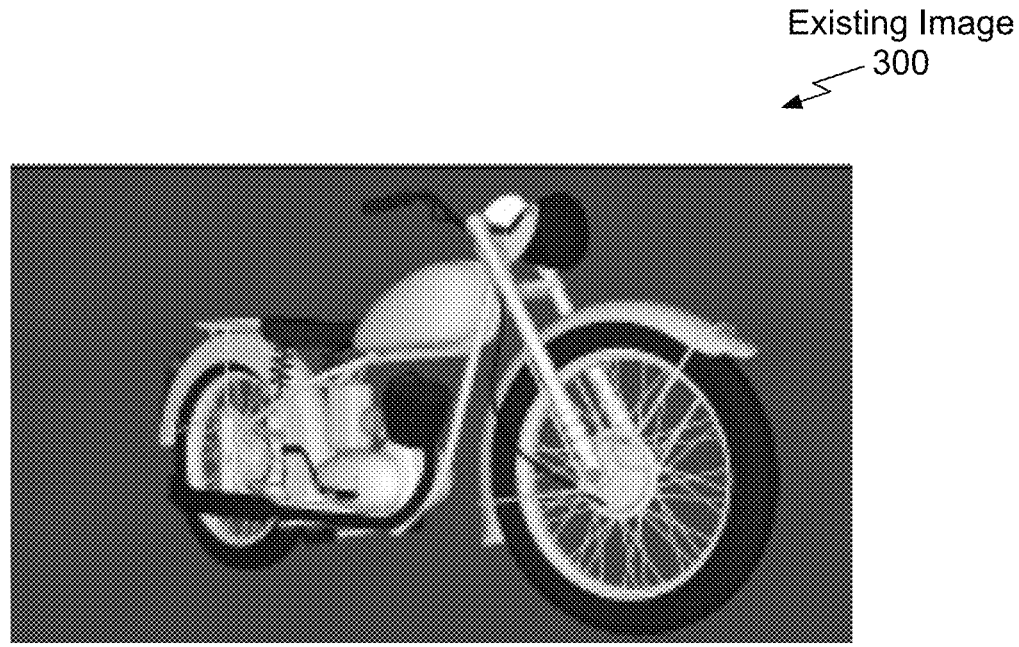
FIG. 3A illustrates an existing image to be processed for display by a near-eye light field display device, according to one embodiment.
Figure 3B:
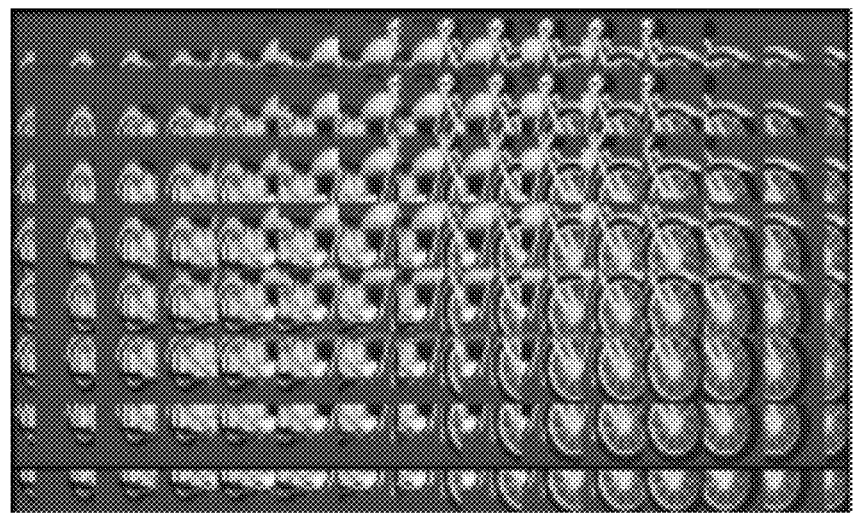
FIG. 3B illustrates a microdisplay image comprising an elemental image corresponding to each microlens, according to one embodiment.

FIG. 3A illustrates an existing image 300 to be processed for display by a near-eye light field display device, according to one embodiment. The existing image 300 is stored as a texture map (e.g., viewTexture) that is used to compute a color for each pixel of a microdisplay image.

FIG. 3B illustrates a microdisplay image 310 comprising an elemental image corresponding to each microlens in the microlens array 255, according to one embodiment. The microdisplay image 310 may be displayed by the microdisplay 250, microdisplay 251, and/or microdisplay 252.

Figure 3C:
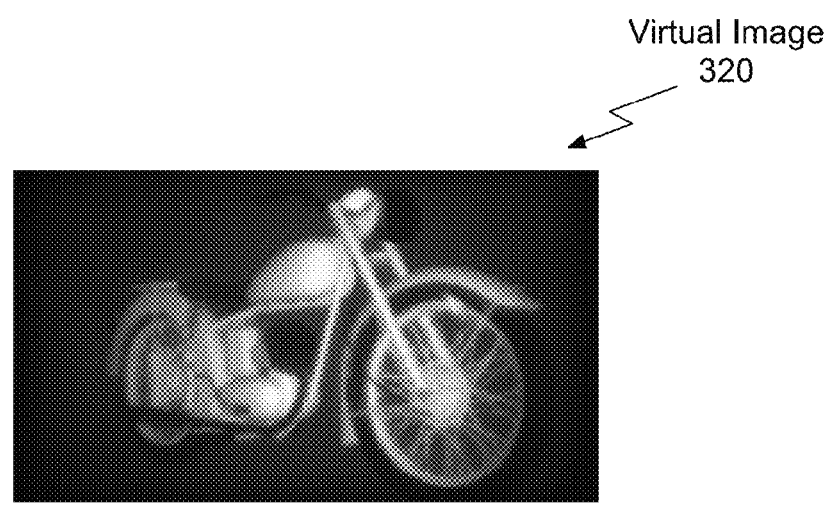
FIG. 3C illustrates the microdisplay image of FIG. 3B viewed through a microlens array, according to one embodiment.

FIG. 3C illustrates a virtual image 320 that is the microdisplay image 310 of FIG. 3B viewed through the microlens array 255, according to one embodiment. When the microdisplay 250 is viewed through the microlens array 255, the virtual image 320 that corresponds to the existing image 300 is produced at the virtual display plane 210.

Figure 3D:
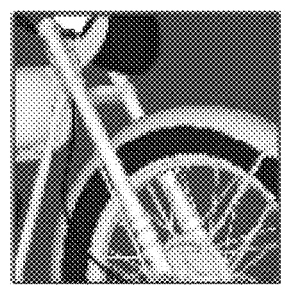
FIG. 3D illustrates an elemental image produced without anti-aliasing and an elemental image produced with anti-aliasing, according to one embodiment.
Figure 3D:
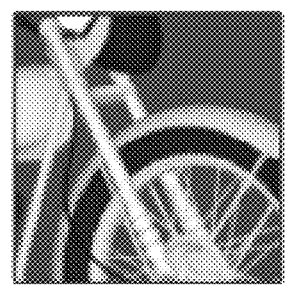

FIG. 3D illustrates an elemental image 330 produced without anti-aliasing and an elemental image produced with anti-aliasing 340, according to one embodiment. The existing image 300 may be preprocessed before the microdisplay image 310 is generated to produce anti-aliased elemental images. When the anti-aliased elemental images are included as the microdisplay image 310, an anti-aliased virtual image is produced at the virtual display plane 210.

In one embodiment, stereoscopic image pairs are assumed to be oversampled relative to the resolution of the near-eye light field display device 260. A low-pass filter length $\hat{p}_v$ may be determined by the size of the pixels of the microdisplay, as magnified by projection into the virtual display plane 210. The parameter $\hat{p}_v$ may be computed as:

$$\hat{p}_v = \frac{M_p}{w_v} = \left(\frac{d_v - d_e}{d_l}\right)\left(\frac{p}{w_v}\right),$$

where the length is expressed in normalized texture coordinate units, M corresponds to a magnification factor, and p is the normalized texture coordinate representing the location of a pixel that is close to the current pixel being processed, p0, described further herein.

The pseudo code shown in TABLE 7 may be included in a fragment shader program to perform preprocessing for anti-aliasing. The variable antialiasLength is the parameter $\hat{p}_v$. As shown in the pseudo code in TABLE 7, p0 is ultimately assigned a new color during execution of a fragment shader program. The locations of neighboring pixels are stored in the temporary variable p, and then the colors of the neighboring pixels are averaged to determine a color that is assigned to p0. While the pseudo code in TABLE 7 implements a separable filter that is commonly chosen for efficiency, those skilled in the art will recognize that other filters, including non-separable filters are also possible.

TABLE 7

```
uniform sampler2D viewTexture;
// anti-aliasing variables
uniform int      antialiasDirection;    // filter direction (0: horizontal, 1: vertical)
uniform float    antialiasLength;       // filter length in normalize texture coordinates
uniform int      antialiasNumSamples;   // number of samples along filter length
void main( ){
    // evaluate texture coordinate
    vec2 p0 = gl_TexCoord[0].st;
    // Apply separable anti-aliasing filter, if needed
    if (antialiasNumSamples > 0) {
        // Evaluate temporary anit-aliasing variables
        float antialiasSampleOffset = antialiasLength/float(antialiasNumSamples - 1);
        float antialiasHalfLength = antialiasLength/2.0;
```

TABLE 7-continued

```
        float antialiasWeight = 1.0/float(antialiasNumSamples;
        vec3 color = vec3(0.0, 0.0, 0.0);
        vec2 p;
        //Apply 1D filter along horizontal or vertical axis
        if (antialiasDirection == 0){
            for (int i=0; i<antialiasNumSamples; i++){
                p=p0+vec2(antialiasSampleOffset*float(i)-antialiasHalfLength, 0.0);
                color += antialiasWeight*texture2D(viewTexture, p).rgb;
            }
        } else {
            for (int i=0; i<antialiasNumSamples; i++){
                p=p0+vec2(0.0, antialiasSampleOffset*float(i)-antialiasHalfLength);
                color += antialiasWeight*texture2D(viewTexture, p).rgb;
            }
        }
        gl_FragColor = vec4( color, 1.0);
    } else{
        // No anti-aliasing is required, so pass through the input color
        gl_FragColor = vec4(texture2D(viewTexture, p0).rgb, 1.0);
    }
}
```

Figure 3E:
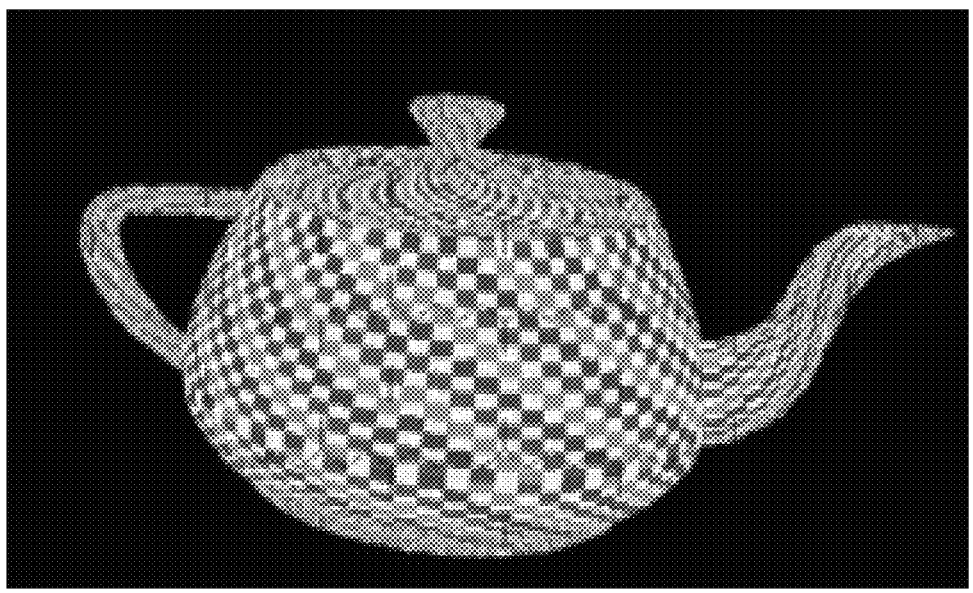
FIG. 3E illustrates another existing image to be processed for display by a near-eye light field display device, according to one embodiment.

FIG. 3E illustrates an existing image 350 to be processed for display by a near-eye light field display device, according to one embodiment. The pattern on the teapot consists of diagonal stripes alternating in red, green, and blue (the image is shown in greyscale).

Figure 3F:
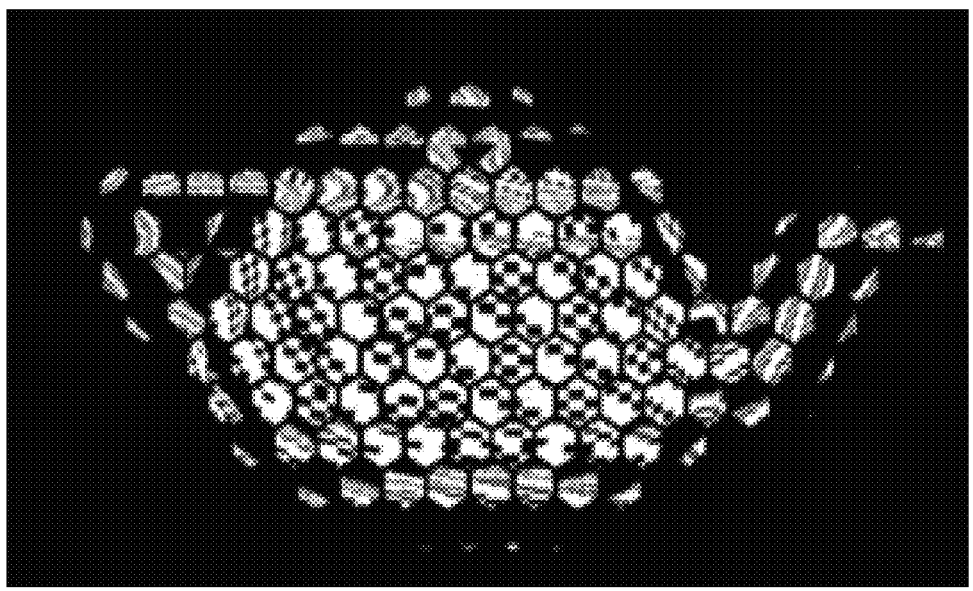
FIG. 3F illustrates a microdisplay image comprising an elemental image corresponding to each pinlight in a pinlight array, according to one embodiment.

FIG. 3F illustrates a microdisplay image 310 comprising the red channel of an elemental image corresponding to each pinlight in the pinlight array 276 or 277 when the pinlights are shaped as hexagons and are arranged in a hexagonal array, according to one embodiment. The microdisplay image 360 may be displayed by the microdisplay 271 and/or microdisplay 272. In other embodiments, the pinlights may have a different shape, such as square, rectangular, or circular.

Figure 4:
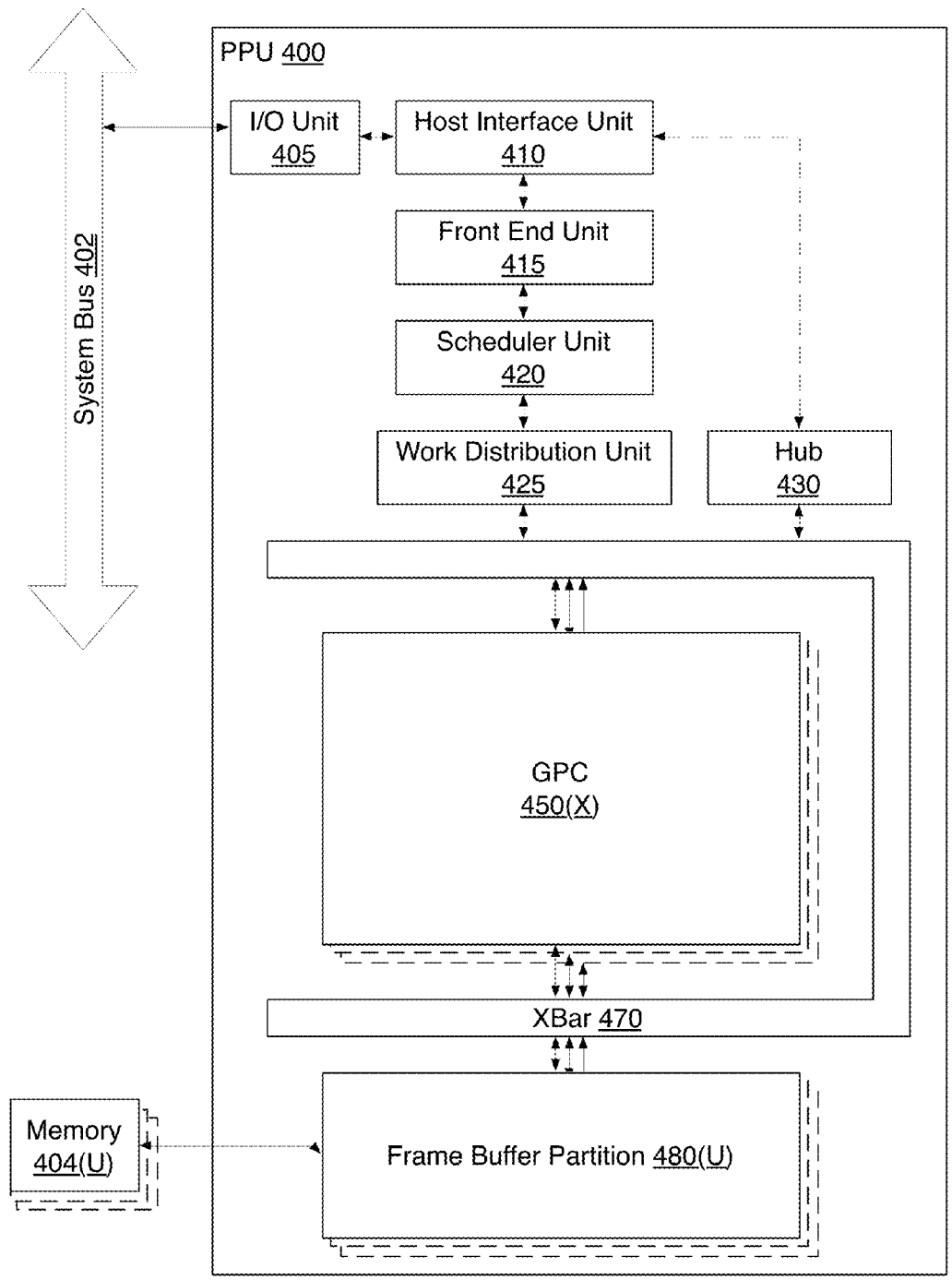
FIG. 4 illustrates a parallel processing unit, in accordance with one embodiment.

FIG. 4 illustrates a parallel processing unit (PPU) 400, in accordance with one embodiment. In one embodiment, the PPU 400 is a multi-threaded processor that is implemented on one or more integrated circuit devices. The PPU 400 is a latency hiding architecture designed to process a large number of threads in parallel. A thread (i.e., a thread of execution) is an instantiation of a set of instructions configured to be executed by the PPU 400. In one embodiment, the PPU 400 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 4, the PPU 400 includes an Input/Output (I/O) unit 405, a host interface unit 410, a front end unit 415, a scheduler unit 420, a work distribution unit 425, a hub 430, a crossbar (Xbar) 670, one or more general processing clusters (GPCs) 450, and one or more partition units 480. The PPU 400 may be connected to a host processor or other peripheral devices via a system bus 402. The PPU 400 may also be connected to a local memory comprising a number of memory devices 404. In one embodiment, the local memory may comprise a number of dynamic random access memory (DRAM) devices.

The I/O unit 405 is configured to transmit and receive communications (i.e., commands, data, etc.) from a host processor (not shown) over the system bus 402. The I/O unit 405 may communicate with the host processor directly via the system bus 402 or through one or more intermediate devices such as a memory bridge. In one embodiment, the I/O unit 405 implements a Peripheral Component Interconnect Express (PCIe) interface for communications over a PCIe bus. In alternative embodiments, the I/O unit 405 may implement other types of well-known interfaces for communicating with external devices.

The I/O unit 405 is coupled to a host interface unit 410 that decodes packets received via the system bus 402. In one embodiment, the packets represent commands configured to cause the PPU 400 to perform various operations. The host interface unit 410 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the host interface unit 410 is configured to route communications between and among the various logical units of the PPU 400.

In one embodiment, a program executed by the host processor encodes a command stream in a buffer that provides workloads to the PPU 400 for processing. A workload may comprise a number of instructions and data to be processed by those instructions. The buffer is a region in a memory that is accessible (i.e., read/write) by both the host processor and the PPU 400. For example, the host interface unit 410 may be configured to access the buffer in a system memory connected to the system bus 402 via memory requests transmitted over the system bus 402 by the I/O unit 405. In one embodiment, the host processor writes the command stream to the buffer and then transmits a pointer to the start of the command stream to the PPU 400. The host interface unit 410 provides the front end unit 415 with pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In one embodiment, the work distribution unit 425 manages a pending task pool and an active task pool for each of the GPCs 450. The pending task pool may comprise a number of slots (e.g., 16 slots) that contain tasks assigned to be processed by a particular GPC 450. The active task pool may comprise a number of slots (e.g., 4 slots) for tasks that are actively being processed by the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

The work distribution unit 425 communicates with the one or more GPCs 450 via a XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 are coupled to the host unit 410. The other units may also be connected to the XBar 470 via a hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the partition units 480, which implement a memory interface for reading and writing data to/from the memory 404. In one embodiment, the PPU 400 includes a number U of partition units 480 that is equal to the number of separate and distinct memory devices 404 coupled to the PPU 400. A partition unit 480 will be described in more detail below in conjunction with FIG. 5B.

In one embodiment, a host processor executes a driver kernel that implements an application programming interface (API) that enables one or more applications executing on the host processor to schedule operations for execution on the PPU 400. An application may generate instructions (i.e., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 5A:
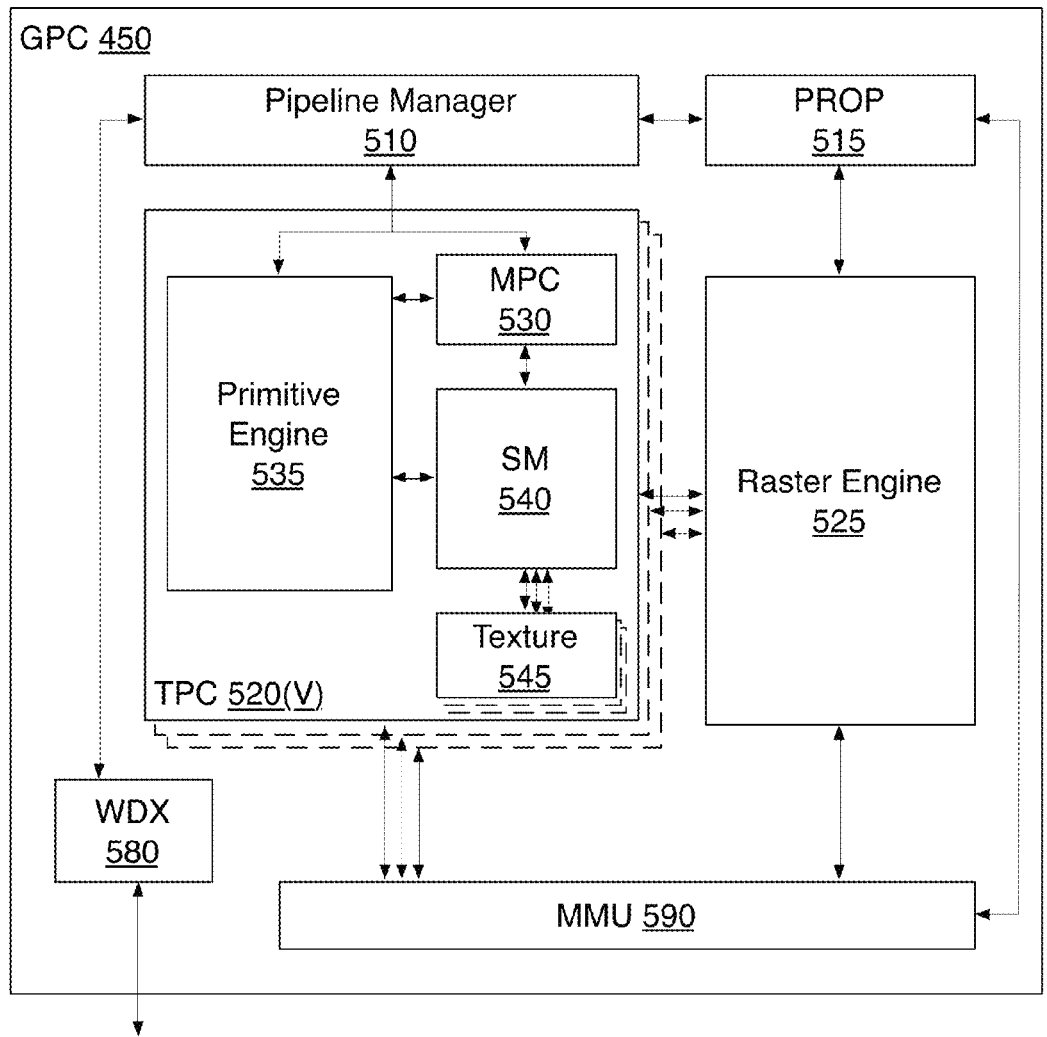
FIG. 5A illustrates a general processing cluster of the parallel processing unit of FIG. 4, in accordance with one embodiment.

FIG. 5A illustrates a GPC 450 of the PPU 400 of FIG. 4, in accordance with one embodiment. As shown in FIG. 5A, each GPC 450 includes a number of hardware units for processing tasks. In one embodiment, each GPC 450 includes a pipeline manager 510, a pre-raster operations unit (PROP) 515, a raster engine 525, a work distribution crossbar (WDX) 580, a memory management unit (MMU) 590, and one or more Texture Processing Clusters (TPCs) 520. It will be appreciated that the GPC 450 of FIG. 5A may include other hardware units in lieu of or in addition to the units shown in FIG. 5A.

In one embodiment, the operation of the GPC 450 is controlled by the pipeline manager 510. The pipeline manager 510 manages the configuration of the one or more TPCs 520 for processing tasks allocated to the GPC 450. In one embodiment, the pipeline manager 510 may configure at least one of the one or more TPCs 520 to implement at least a portion of a graphics rendering pipeline. For example, a TPC 520 may be configured to execute a vertex shader program on the programmable streaming multiprocessor (SM) 540. The pipeline manager 510 may also be configured to route packets received from the work distribution unit 425 to the appropriate logical units within the GPC 450. For example, some packets may be routed to fixed function hardware units in the PROP 515 and/or raster engine 525 while other packets may be routed to the TPCs 520 for processing by the primitive engine 535 or the SM 540.

The PROP unit 515 is configured to route data generated by the raster engine 525 and the TPCs 520 to a Raster Operations (ROP) unit in the partition unit 480, described in more detail below. The PROP unit 515 may also be configured to perform optimizations for color blending, organize pixel data, perform address translations, and the like.

The raster engine 525 includes a number of fixed function hardware units configured to perform various raster operations. In one embodiment, the raster engine 525 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 580 comprises fragments to be processed, for example, by a fragment shader implemented within a TPC 520.

Each TPC 520 included in the GPC 450 includes an M-Pipe Controller (MPC) 530, a primitive engine 535, an SM 540, and one or more texture units 545. The MPC 530 controls the operation of the TPC 520, routing packets received from the pipeline manager 510 to the appropriate units in the TPC 520. For example, packets associated with a vertex may be routed to the primitive engine 535, which is configured to fetch vertex attributes associated with the vertex from the memory 404. In contrast, packets associated with a shader program may be transmitted to the SM 540.

In one embodiment, the texture units 545 are configured to load texture maps (e.g., a 2D array of texels) from the memory 404 and sample the texture maps to produce sampled texture values for use in shader programs executed by the SM 540. The texture units 545 implement texture operations such as filtering operations using mip-maps (i.e., texture maps of varying levels of detail). In one embodiment, each TPC 520 includes four (4) texture units 545.

The SM 540 comprises a programmable streaming processor that is configured to process tasks represented by a number of threads. Each SM 540 is multi-threaded and configured to execute a plurality of threads (e.g., 32 threads) from a particular group of threads concurrently. In one embodiment, the SM 540 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 540 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 540 may be described in more detail below in conjunction with FIG. 6A.

The MMU 590 provides an interface between the GPC 450 and the partition unit 480. The MMU 590 may provide translation of virtual addresses into physical addresses, memory protection, and arbitration of memory requests. In one embodiment, the MMU 590 provides one or more translation lookaside buffers (TLBs) for improving translation of virtual addresses into physical addresses in the memory 404.

Figure 5B:
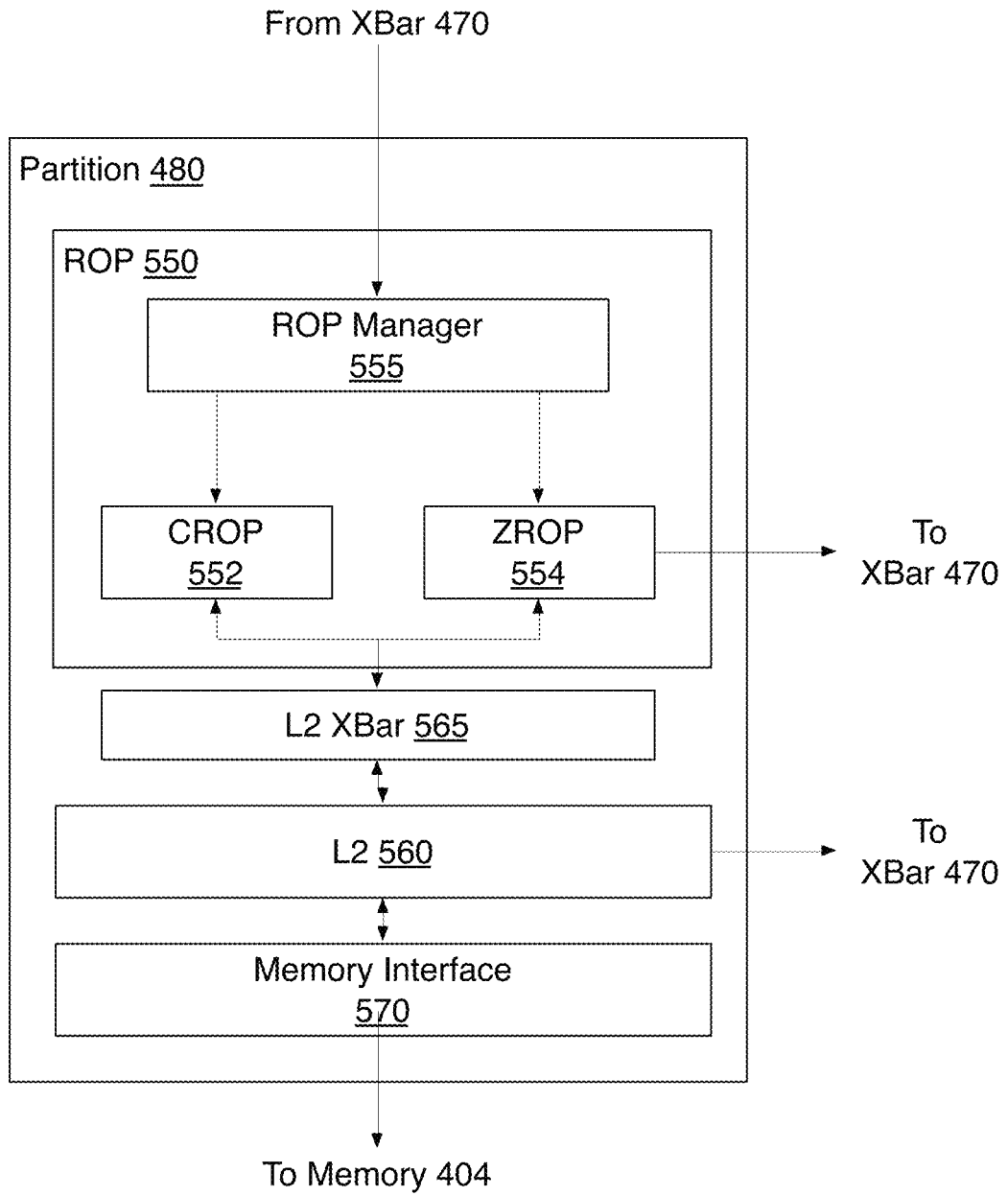
FIG. 5B illustrates a partition unit of the parallel processing unit of FIG. 4, in accordance with one embodiment.

FIG. 5B illustrates a partition unit 480 of the PPU 400 of FIG. 4, in accordance with one embodiment. As shown in FIG. 5B, the partition unit 480 includes a Raster Operations (ROP) unit 550, a level two (L2) cache 560, a memory interface 570, and an L2 crossbar (XBar) 565. The memory interface 570 is coupled to the memory 404. Memory interface 570 may implement 16, 32, 64, 128-bit data buses, or the like, for high-speed data transfer. In one embodiment, the PPU 400 comprises U memory interfaces 570, one memory interface 570 per partition unit 480, where each partition unit 480 is connected to a corresponding memory device 404. For example, PPU 400 may be connected to up to U memory devices 404, such as graphics double-data-rate, version 5, synchronous dynamic random access memory (GDDR5 SDRAM). In one embodiment, the memory interface 570 implements a DRAM interface and U=6.

In one embodiment, the PPU 400 implements a multi-level memory hierarchy. The memory 404 is located off-chip in SDRAM coupled to the PPU 400. Data from the memory 404 may be fetched and stored in the L2 cache 560, which is located on-chip and is shared between the various GPCs 450. As shown, each partition unit 480 includes a portion of the L2 cache 560 associated with a corresponding memory device 404. Lower level caches may then be implemented in various units within the GPCs 450. For example, each of the SMs 540 may implement a level one (L1) cache. The L1 cache is private memory that is dedicated to a particular SM 540. Data from the L2 cache 560 may be fetched and stored in each of the L1 caches for processing in the functional units of the SMs 540. The L2 cache 560 is coupled to the memory interface 570 and the XBar 470.

The ROP unit 550 includes a ROP Manager 355, a Color ROP (CROP) unit 552, and a Z ROP (ZROP) unit 554. The CROP unit 552 performs raster operations related to pixel color, such as color compression, pixel blending, and the like. The ZROP unit 554 implements depth testing in conjunction with the raster engine 525. The ZROP unit 554 receives a depth for a sample location associated with a pixel fragment from the culling engine of the raster engine 525. The ZROP unit 554 tests the depth against a corresponding depth in a depth buffer for a sample location associated with the fragment. If the fragment passes the depth test for the sample location, then the ZROP unit 554 updates the depth buffer and transmits a result of the depth test to the raster engine 525. The ROP Manager 355 controls the operation of the ROP unit 550. It will be appreciated that the number of partition units 480 may be different than the number of GPCs 450 and, therefore, each ROP unit 550 may be coupled to each of the GPCs 450. Therefore, the ROP Manager 355 tracks packets received from the different GPCs 450 and determines which GPC 450 that a result generated by the ROP unit 550 is routed to. The CROP unit 552 and the ZROP unit 554 are coupled to the L2 cache 560 via an L2 XBar 565.

Figure 6A:
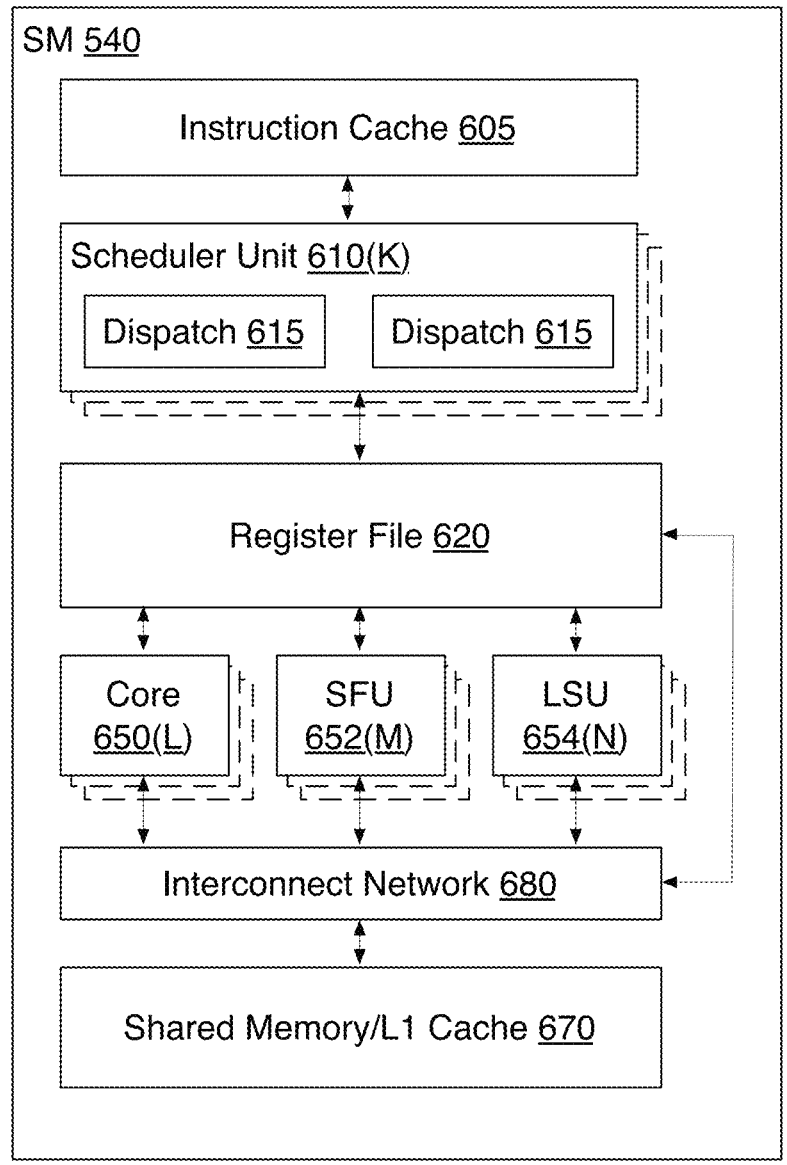
FIG. 6A illustrates the streaming multi-processor of FIG. 5A, in accordance with one embodiment.

FIG. 6A illustrates the streaming multi-processor 540 of FIG. 5A, in accordance with one embodiment. As shown in FIG. 6A, the SM 540 includes an instruction cache 605, one or more scheduler units 610, a register file 620, one or more processing cores 650, one or more special function units (SFUs) 652, one or more load/store units (LSUs) 654, an interconnect network 680, and a shared memory/L1 cache 670.

As described above, the work distribution unit 425 dispatches tasks for execution on the GPCs 450 of the PPU 400. The tasks are allocated to a particular TPC 520 within a GPC 450 and, if the task is associated with a shader program, the task may be allocated to an SM 540. The scheduler unit 610 receives the tasks from the work distribution unit 425 and manages instruction scheduling for one or more groups of threads (i.e., warps) assigned to the SM 540. The scheduler unit 610 schedules threads for execution in groups of parallel threads, where each group is called a warp. In one embodiment, each warp includes 32 threads. The scheduler unit 610 may manage a plurality of different warps, scheduling the warps for execution and then dispatching instructions from the plurality of different warps to the various functional units (i.e., cores 650, SFUs 652, and LSUs 654) during each clock cycle.

In one embodiment, each scheduler unit 610 includes one or more instruction dispatch units 615. Each dispatch unit 615 is configured to transmit instructions to one or more of the functional units. In the embodiment shown in FIG. 6A, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 540 includes a register file 620 that provides a set of registers for the functional units of the SM 540. In one embodiment, the register file 620 is divided between each of the functional units such that each functional unit is allocated a dedicated portion of the register file 620. In another embodiment, the register file 620 is divided between the different warps being executed by the SM 540. The register file 620 provides temporary storage for operands connected to the data paths of the functional units.

Each SM 540 comprises L processing cores 450. In one embodiment, the SM 540 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-4008 standard for floating point arithmetic. Each SM 540 also comprises M SFUs 652 that perform special functions (e.g., pixel blending operations, and the like), and N LSUs 654 that implement load and store operations between the shared memory/L1 cache 670 and the register file 620. In one embodiment, the SM 540 includes 192 cores 650, 32 SFUs 652, and 32 LSUs 654.

Each SM 540 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

The shared memory/L1 cache 670 is an array of on-chip memory that, in one embodiment, may be configured as either shared memory or an L1 cache, or a combination of both, as the application demands. For example, the shared memory/L1 cache 670 may comprise 64 kB of storage capacity. The shared memory/L1 cache 670 may be configured as 64 kB of either shared memory or L1 cache, or a combination of the two such as 16 kB of L1 cache and 48 kB of shared memory.

The PPU 400 described above may be configured to perform highly parallel computations much faster than conventional CPUs. Parallel computing has advantages in graphics processing, data compression, biometrics, stream processing algorithms, and the like.

In one embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (i.e., pixel data for each of the pixels of the display).

An application writes model data for a scene (i.e., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 540 of the PPU 400 including one or more of a vertex shader, hull shader, domain shader, geometry shader, and a pixel shader. For example, one or more of the SMs 540 may be configured to execute a vertex shader program that processes a number of vertices defined by the model data. In one embodiment, the different SMs 540 may be configured to execute different shader programs concurrently. For example, a first subset of SMs 540 may be configured to execute a vertex shader program while a second subset of SMs 540 may be configured to execute a pixel shader program. The first subset of SMs 540 processes vertex data to produce processed vertex data and writes the processed vertex data to the L2 cache 560 and/or the memory 404. After the processed vertex data is rasterized (i.e., transformed from three-dimensional data into two-dimensional data in screen space) to produce fragment data, the second subset of SMs 540 executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 400 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 400 is embodied on a single semiconductor substrate. In another embodiment, the PPU 400 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 400 may be included on a graphics card that includes one or more memory devices 404 such as GDDR5 SDRAM. The graphics card may be configured to interface with a PCIe slot on a motherboard of a desktop computer that includes, e.g., a northbridge chipset and a southbridge chipset. In yet another embodiment, the PPU 400 may be an integrated graphics processing unit (iGPU) included in the chipset (i.e., Northbridge) of the motherboard.

This invention describes a method to render a near-eye light field—a set of rays emitted by a light field display in close proximity to the eye. The method allows more traditional image sources to be used to decide the color of each ray, rather than using brute force ray tracing. Image sources could be monoscopic (i.e., normal 2D images), or stereoscopic (one image for each eye, rendering with correct binocular perspective), or multiscopic, where multiple views are rendered for a set of different viewing positions and camera orientations. Multiscopic data is the data format used by multiview 3D televisions, but also encompassed other forms, such as multiple panoramas provided by applications like Google Earth®. A source image set in a variety of different data formats may be used to estimate the color of a ray, given knowledge of how the source images were generated and configuration of the particular near-eye light field display.

Figure 6B:
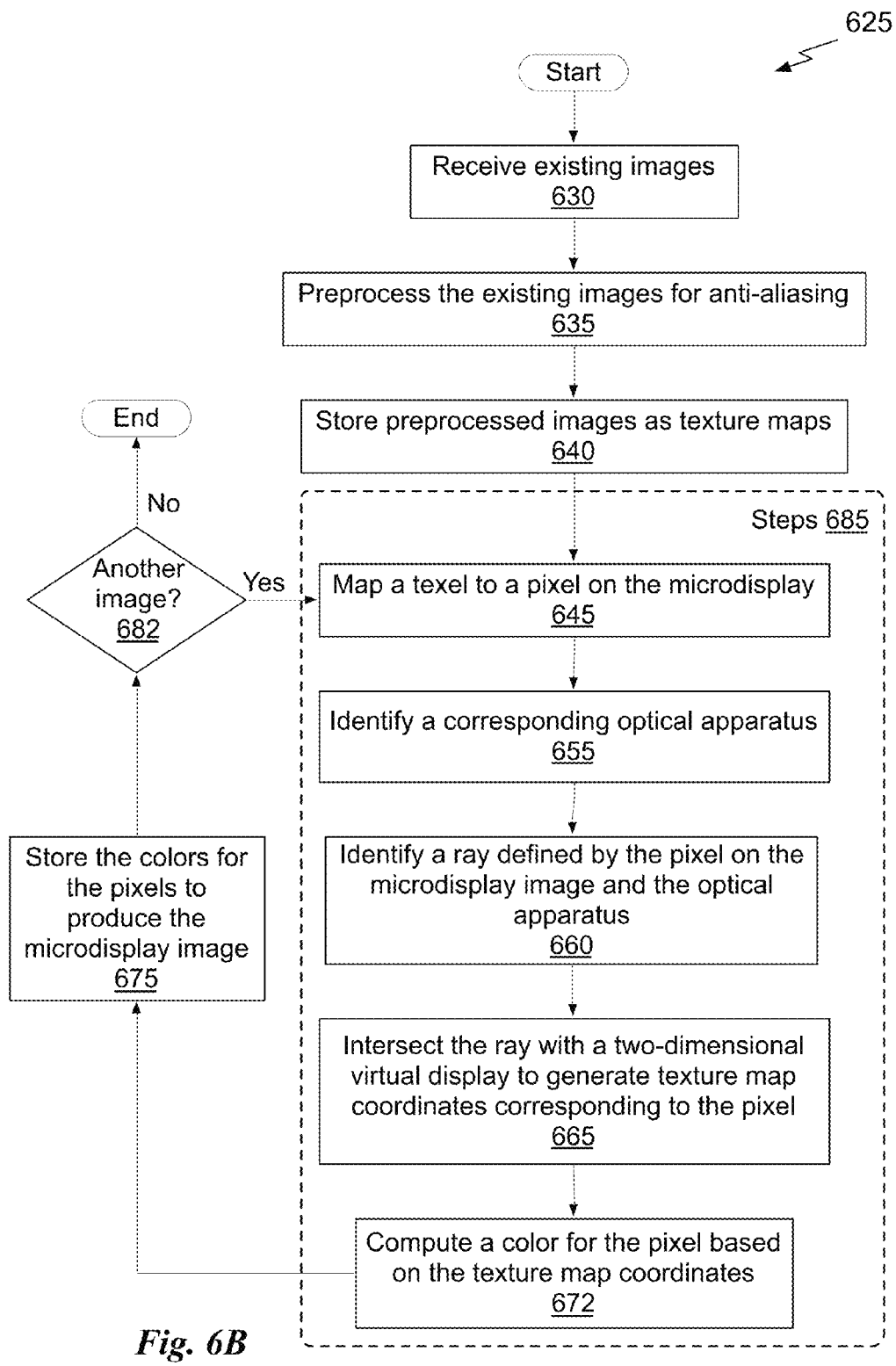
FIG. 6B illustrates a flowchart of a method for producing images for the near-eye light field display devices of FIGS. 2A, 2B, and 2C, in accordance with one embodiment.

FIG. 6B illustrates a flowchart of a method 625 for producing images for a near-eye light field display device 200 or 260 of FIGS. 2A, 2B, and 2C, in accordance with one embodiment. Although the method 625 is described in the context of a program executed by a processor, the method 625 may also be performed by custom circuitry or by a combination of custom circuitry and a program.

At step 630, existing images are received. The existing images may be individual two-dimensional images, stereoscopic image pairs, or multiscopic image sets. When eye-tracking is used, nearest-match source images in a multiscopic image set may be selected for each eye. In one embodiment, two or more source images of a multiscopic image set may be interpolated to produce a matching source image. At step 635, the existing images are preprocessed when anti-aliasing is enabled. In one embodiment, the existing images are filtered using the low-pass filter length $\hat{p}_v$. When anti-aliasing is disabled, step 635 may be omitted. At step 640, the preprocessed existing images are stored as texture maps.

At step 645, a texel of a texture map corresponding to one of the existing images is mapped to a pixel on the microdisplay 250, left microdisplay 251, or right microdisplay 252. When the texture map corresponds to an individual two-dimensional image, the texel is mapped to a pixel on the left microdisplay 251 and a pixel on the right microdisplay 252. When the texture map corresponds to the left eye image of a stereoscopic image pair, the texel is mapped to a pixel on the left microdisplay 251. When the texture map corresponds to the right eye image of a stereoscopic image pair, the texel is mapped to a pixel on the right microdisplay 252. Steps 645 through 672 (shown as steps 685) may be performed in parallel to process multiple pixels of the left microdisplay 251 and right microdisplay 252. For example, each thread may receive coordinates of a texel and may map the texel coordinates to coordinates of the left microdisplay 251 or right microdisplay 252.

At step 655, an optical apparatus (e.g., microlens in the microlens array 255, left microlens array 256, right microlens array 257, pinlight in the left pinlight array 276, or pinlight in the right pinlight array 277) corresponding to the pixel on the microdisplay (e.g., microdisplay 250, left microdisplay 251, right microdisplay 252, left microdisplay 271, or right microdisplay 272, respectively) is identified. At step 660, a ray defined by the pixel and the optical apparatus is identified. For example, when the optical apparatus is a microlens array, the ray is defined by the (x,y,z) location of the pixel and the (x,y,z) location of the optical center of the microlens. When the optical apparatus is a pinlight array, the ray is defined by the (x,y,z) location of the pixel and the (x,y,z) location of the center of the pinlight. At step 665, the ray is intersected with a two-dimensional virtual display plane 210 to generate texture map coordinates corresponding to the pixel. At step 672, a color for the pixel is computed based on the texture map coordinates. Multiple texels (e.g., color samples) may be read from the texture map and combined (i.e., filtered) to compute the color for the pixel. When steps 645 through 672 are performed in parallel, each thread computes a color for the left microdisplay 251 or the right microdisplay 252.

At step 675, the computed colors for the pixels are stored to produce at least one microdisplay image. The colors may be stored in a data structure (e.g., frame buffer) for a microdisplay image in a memory. The pixel colors for the left microdisplay 251 define a left microdisplay image and the pixel colors for the right microdisplay 252 define a right microdisplay image. At step 682, the shader program determines if another existing image should be processed, and, if not, the shader program terminates. Otherwise, steps 685 are repeated to produce one or more additional microdisplay images.

Figure 7:
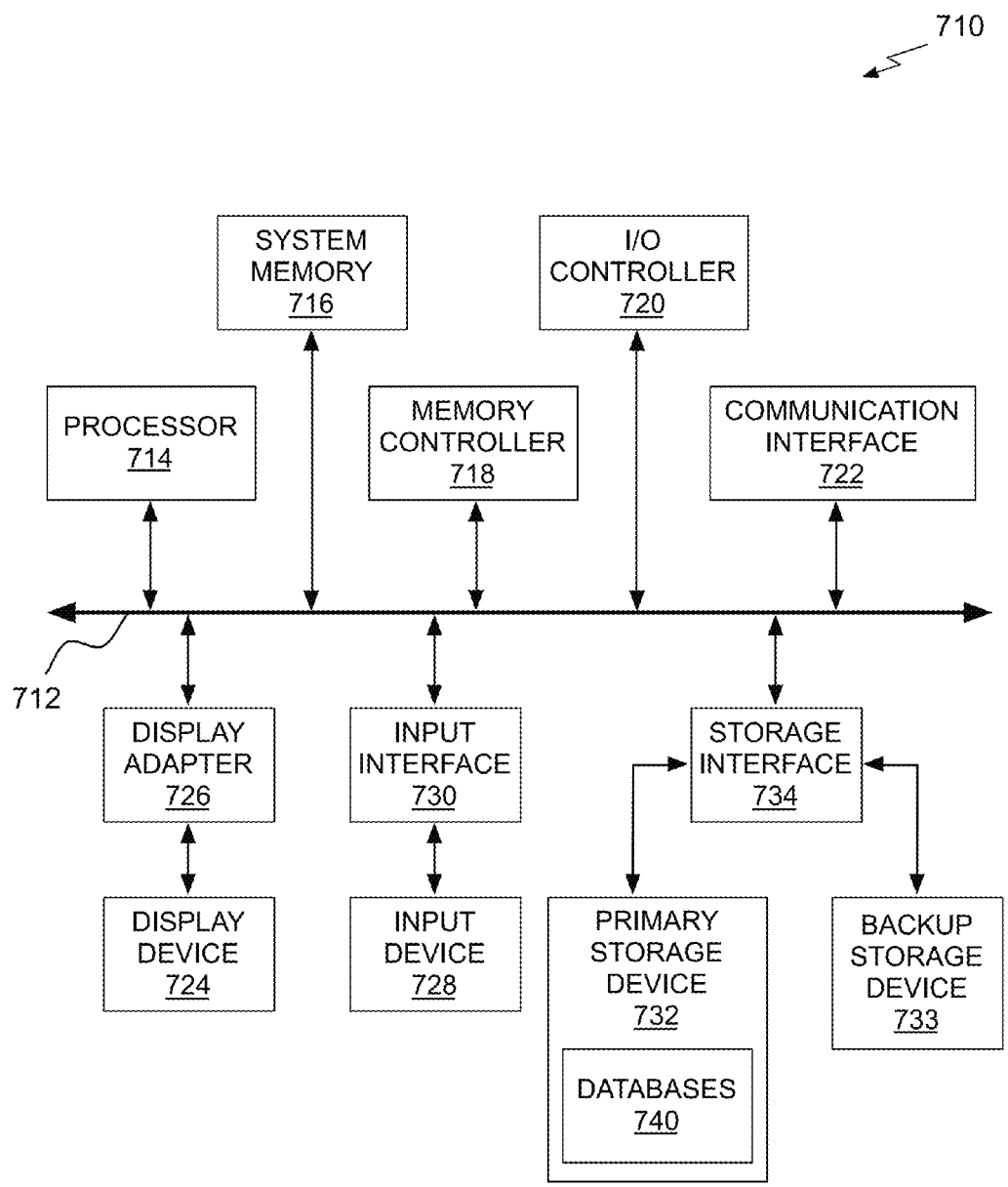
FIG. 7 illustrates an exemplary computer system in which the various architecture and/or functionality of the various previous embodiments may be implemented.

FIG. 7 is a block diagram of an example of a computing system 710 capable of implementing embodiments of the present disclosure. Computing system 710 broadly represents any single or multi-processor computing device or system capable of executing computer-readable instructions. Examples of computing system 710 include, without limitation, workstations, laptops, client-side terminals, servers, distributed computing systems, embedded devices, automotive computing devices, handheld devices (e.g., cellular phone, tablet computer, digital camera, etc.), worn devices (e.g. head-mounted or waist-worn devices), or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, RAM, ROM, flash memory, or any other suitable memory device. Although not required, in certain embodiments computing system 710 may include both a volatile memory unit (such as, for example, system memory 716) and a non-volatile storage device (such as, for example, primary storage device 732).

Computing system 710 may also include one or more components or elements in addition to processor 714 and system memory 716. For example, in the embodiment of FIG. 7, computing system 710 includes a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between example computing system 710 and one or more additional devices. For example, communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In one embodiment, communication interface 722 provides a direct connection to a remote server via a direct link to a network, such as the Internet. Communication interface 722 may also indirectly provide such a connection through any other suitable connection.

Communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data for display on display device 724. In one embodiment, the display device 724 may be the near-eye light field display device 200 or the binocular near-eye light field display device shown in FIG. 2B or 2C and one or more components shown in the computing system 710 may be integrated into an eyeglass form factor of the near-eye light field display device 200 or the binocular near-eye light field display device shown in FIG. 2B or 2C. In one embodiment, one or more of the components shown in the computing system 710 are external to the eyeglass form factor and may be worn elsewhere by a user or may be entirely remote (i.e., connected via a wireless or wired communication system). A power supply (i.e., battery, power source, or power interface) may be integrated into the eyeglass form factor or may be external to the eyeglass form factor.

As illustrated in FIG. 7, computing system 710 may also include at least one input device 728 coupled to communication infrastructure 712 via an input interface 730. Input device 728 generally represents any type or form of input device capable of providing input, either computer- or human-generated, to computing system 710. Examples of input device 728 include, without limitation, a keyboard, a pointing device, a speech recognition device, an eye-tracking system, ambient light sensing system, depth sensor, light field camera, environmental motion-tracking sensor, an internal motion-tracking sensor, a gyroscopic sensor, accelerometer sensor, an electronic compass sensor, a charge-coupled device (CCD) image sensor, a complementary metal-oxide-semiconductor (CMOS) image sensor, or any other input device. In one embodiment, the input device 728 may be configured to provide the pupil characteristics such as the diameter, orientation, and position, to the processor 714. In one embodiment, the input device 728 may also receive communications from other near-eye light field display devices 200 (i.e., near-eye light field eyeglasses) in the environment, for example, when multiple users of near-eye light field display devices are nearby.

As illustrated in FIG. 7, computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In one example, databases 740 may be stored in primary storage device 732. Databases 740 may represent portions of a single database or computing device or it may represent multiple databases or computing devices. For example, databases 740 may represent (be stored on) a portion of computing system 710. Alternatively, databases 740 may represent (be stored on) one or more physically separate devices capable of being accessed by a computing device, such as computing system 710.

Continuing with reference to FIG. 7, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be separate devices accessed through other interface systems.

Many other devices or subsystems may be connected to computing system 710. Conversely, all of the components and devices illustrated in FIG. 7 need not be present to practice the embodiments described herein. The devices and subsystems referenced above may also be interconnected in different ways from that shown in FIG. 7. Computing system 710 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of the example embodiments described and/or illustrated herein. Additionally or alternatively, the example embodiments described and/or illustrated herein may be implemented in firmware and/or hardware.

For example, a computer program for determining an image and/or a mask to be encoded in a near-eye display layer 515 based on a target image 525 may be stored on the computer-readable medium and then stored in system memory 716 and/or various portions of storage devices 732 and 733. When executed by the processor 714, the computer program may cause the processor 714 to perform and/or be a means for performing the functions required for carrying out the determination of an image and/or the mask encoding different attenuation patterns discussed above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method, comprising:
   identifying a ray defined by a pixel of a microdisplay and an optical apparatus of a near-eye light field display device;
   generating map coordinates corresponding to the pixel by:
      determining a first displacement of the pixel relative to a reference point on the microdisplay,
      determining a second displacement within the optical apparatus of an optical center of the optical apparatus relative to the reference point on the microdisplay,
      computing, based on the first displacement and the second displacement, a point of intersection of the ray and a two dimensional virtual display plane, and
      converting the point of intersection into the map coordinates; and
   computing, based on the map coordinates, a color for the pixel to produce a microdisplay image.

2. The method of claim 1, wherein an existing two-dimensional image is stored as a texture map that is indexed using the map coordinates.

3. The method of claim 1, further comprising:
   preprocessing an existing two-dimensional image to produce a preprocessed existing two-dimensional image that is anti-aliased; and
   storing the preprocessed existing two-dimensional image as a texture map that is indexed using the map coordinates.

4. The method of claim 1, further comprising identifying additional rays, generating additional map coordinates, and computing additional colors for additional pixels of the microdisplay to produce the microdisplay image.

5. The method of claim 1, further comprising storing the color for the pixel in a data structure for the microdisplay image in a memory.

6. The method of claim 5, wherein the microdisplay image corresponds to a left-eye image or a right-eye image of a stereoscopic image pair.

7. The method of claim 5, wherein the microdisplay image corresponds to an image of a multiscopic image set.

8. The method of claim 1, further comprising:
   sampling multiple texels of a texture map based on the map coordinates; and
   combining the multiple texels to compute the color for the pixel.

9. The method of claim 1, wherein a depth of the two-dimensional virtual display plane relative to a viewer's eye is based on an eyeglass prescription.

10. The method of claim 1, wherein multiple processing threads are configured to execute a fragment shader program to compute colors for pixels of the microdisplay in parallel.

11. The method of claim 1, wherein the color is black when the map coordinates are outside of the virtual display plane.

12. The method of claim 1, wherein a virtual image includes a virtual object that appears to a user of the near-eye light field display device at a depth offset from the virtual display plane.

13. The method of claim 1, wherein the optical apparatus is a microlens.

14. The method of claim 1, wherein computing the point of intersection comprises determining a displacement of the point of intersection within the two-dimensional virtual display plane that is intersected by the ray.

15. A system comprising:
   microdisplay positioned between a near focus plane and a pupil;
   an optical apparatus positioned between the microdisplay and the pupil; and a processor configured to:
identify a ray defined by a pixel of the microdisplay and the optical apparatus;
generate map coordinates corresponding to the pixel by:
determining a first displacement of the pixel relative to a reference point on the microdisplay,
determining a second displacement within the optical apparatus of an optical center of the optical apparatus relative to the reference point on the microdisplay,
computing, based on the first displacement and the second displacement, a point of intersection of the ray and a two dimensional virtual display plane, and
converting the point of intersection into the map coordinates; and
compute a color for the pixel based on the map coordinates.

16. The system of claim 15, further comprising a memory configured to store an existing two-dimensional image as a texture map that is indexed using the map coordinates.

17. The system of claim 15, wherein the processor is further configured to process multiple processing threads that each execute a fragment shader program to compute colors for pixels of the microdisplay in parallel.

18. The system of claim 15, wherein the processor is further configured to:
sample multiple texels of a texture map based on the map coordinates; and
combine the multiple texels to compute the color for the pixel.

19. A non-transitory computer-readable storage medium storing instructions that, when executed by a processor, causes the processor to perform steps comprising:
identifying a ray defined by a pixel of a microdisplay and an optical apparatus of a near-eye light field display device;
generating map coordinates corresponding to the pixel by:
determining a first displacement of the pixel relative to a reference point on the microdisplay,
determining a second displacement within the optical apparatus of an optical center of the optical apparatus relative to the reference point on the microdisplay,
computing, based on the first displacement and the second displacement, a point of intersection of the ray and a two dimensional virtual display plane, and
converting the point of intersection into the map coordinates; and
computing, based on the map coordinates, a color for the pixel to produce a microdisplay image.

20. The non-transitory computer-readable storage medium of claim 19, further comprising:
sampling multiple texels of a texture map based on the map coordinates; and
combining the multiple texels to compute the color for the pixel.

* * * * *